(12) United States Patent
Silverman et al.

(10) Patent No.: US 11,397,911 B2
(45) Date of Patent: Jul. 26, 2022

(54) NETWORK COMPUTER SYSTEM TO MAKE EFFORT-BASED DETERMINATIONS FOR DELIVERY ORDERS

(71) Applicant: Uber Technologies, Inc., San Francisco, CA (US)

(72) Inventors: Scott Silverman, San Francisco, CA (US); Martin Ken Iyoya, San Francisco, CA (US); Wenjun Zhao, San Francisco, CA (US); Zhen Zeng, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 276 days.

(21) Appl. No.: 16/192,342

(22) Filed: Nov. 15, 2018

(65) Prior Publication Data
US 2020/0160264 A1    May 21, 2020

(51) Int. Cl.
*G06Q 10/08*      (2012.01)
*G06Q 10/06*      (2012.01)

(52) U.S. Cl.
CPC ... *G06Q 10/0834* (2013.01); *G06Q 10/06315* (2013.01); *G06Q 10/08355* (2013.01)

(58) Field of Classification Search
CPC ......... G06Q 10/0834; G06Q 10/06315; G06Q 10/08355
USPC ....................................................... 705/334
See application file for complete search history.

(56) References Cited

U.S. PATENT DOCUMENTS

| | | | |
|---|---|---|---|
| 886,587 | A | 5/1908 | Dow |
| 6,006,159 | A | 12/1999 | Schmier |
| 6,226,570 | B1 | 5/2001 | Hahn |
| 6,553,379 | B1 | 4/2003 | Jaeger |
| 6,756,913 | B1 | 6/2004 | Ayed |
| 6,862,572 | B1 | 3/2005 | de Sylva |
| 7,064,681 | B2 | 6/2006 | Horstemeyer |
| 8,315,802 | B2 | 11/2012 | Brown |
| 8,781,501 | B2 | 7/2014 | Kawazoe |
| 9,684,627 | B1 | 6/2017 | Sar |
| 9,754,331 | B1 | 9/2017 | Beckelman |
| 9,993,735 | B2 | 6/2018 | Aghdaie |
| 10,026,055 | B2 | 7/2018 | Riel-Dalpe |
| 10,029,787 | B1 | 7/2018 | Lesser |
| 10,036,641 | B1 | 7/2018 | Iland |

(Continued)

FOREIGN PATENT DOCUMENTS

| | | |
|---|---|---|
| CN | 104751272 | 7/2015 |
| KR | 10-2014-0016053 | 2/2014 |

(Continued)

OTHER PUBLICATIONS

"Online Food Delivery Services: Making Food delivery the New Normal" Published by Journal Marketing Advances and Practices ( Year: 2019).*

(Continued)

*Primary Examiner* — Zeina Elchanti
(74) *Attorney, Agent, or Firm* — Dority & Manning, P.A.

(57) ABSTRACT

A network computer system that determines metrics related to effort and cost on the part of deliverers who deliverer items for delivery orders. The network computer system can implement operations to facilitate or mitigate features that cause deliverers to expend effort or cost when completing delivery tasks.

32 Claims, 7 Drawing Sheets

(56) References Cited

U.S. PATENT DOCUMENTS

| | | |
|---|---|---|
| 10,133,995 B1 | 11/2018 | Reiss |
| 10,152,743 B1 | 12/2018 | Nguyen |
| 10,156,449 B2 | 12/2018 | Colijin |
| 10,176,448 B1 | 1/2019 | Rhodes |
| 10,308,430 B1 | 6/2019 | Brady |
| 10,360,616 B2 | 7/2019 | Lopez |
| 10,366,434 B1 | 7/2019 | Belousova |
| 10,445,672 B2 | 10/2019 | Renfroe |
| 10,467,562 B1 | 11/2019 | Mo |
| 10,467,563 B1 | 11/2019 | Mo |
| 10,586,273 B1 | 3/2020 | Kohli |
| 11,023,990 B2 | 6/2021 | Choski |
| 2001/0047285 A1 | 11/2001 | Borders |
| 2002/0152128 A1 | 10/2002 | Walch |
| 2002/0188492 A1 | 12/2002 | Borton |
| 2004/0030572 A1 | 2/2004 | Campbell |
| 2004/0181454 A1 | 9/2004 | Manno |
| 2004/0210621 A1 | 10/2004 | Antonellis |
| 2004/0260470 A1 | 12/2004 | Rast |
| 2005/0209913 A1 | 9/2005 | Wied |
| 2007/0033087 A1 | 2/2007 | Combs |
| 2008/0046326 A1 | 2/2008 | Horstemeyer |
| 2008/0195428 A1 | 8/2008 | O'Sullivan |
| 2009/0048890 A1 | 2/2009 | Burgh |
| 2010/0153279 A1 | 6/2010 | Zahn |
| 2011/0106583 A1* | 5/2011 | Rozell ............... G06Q 10/02 |
| | | 705/7.29 |
| 2011/0258134 A1 | 10/2011 | Mendez |
| 2011/0307282 A1 | 12/2011 | Camp |
| 2012/0191551 A1 | 7/2012 | Lutnick |
| 2012/0203619 A1 | 8/2012 | Lutnick |
| 2012/0253878 A1 | 10/2012 | Forstall |
| 2012/0296770 A1 | 11/2012 | Lin |
| 2012/0323642 A1 | 12/2012 | Camp |
| 2013/0073327 A1 | 3/2013 | Edelberg |
| 2013/0218727 A1 | 8/2013 | Lutnick |
| 2013/0246207 A1 | 9/2013 | Novak |
| 2014/0011522 A1 | 1/2014 | Lin |
| 2014/0026054 A1 | 1/2014 | Wang |
| 2014/0058902 A1 | 2/2014 | Taylor |
| 2014/0108201 A1 | 4/2014 | Franchette |
| 2014/0122301 A1 | 5/2014 | Tamassia |
| 2014/0129302 A1 | 5/2014 | Amin |
| 2014/0156359 A1 | 6/2014 | Morgan |
| 2014/0164126 A1 | 6/2014 | Nicholas |
| 2014/0172739 A1 | 6/2014 | Anderson |
| 2014/0188750 A1 | 7/2014 | Seiler |
| 2014/0214465 A1 | 7/2014 | L'Heureaux |
| 2014/0229099 A1 | 8/2014 | Garrett |
| 2014/0278635 A1 | 9/2014 | Fulton |
| 2014/0351164 A1* | 11/2014 | Ballenger ............ G01C 21/343 |
| | | 705/338 |
| 2014/0370167 A1 | 12/2014 | Garden |
| 2015/0142640 A1 | 5/2015 | Kneen |
| 2015/0154538 A1 | 6/2015 | Skaaksrud |
| 2015/0204684 A1 | 7/2015 | Rostamian |
| 2015/0223024 A1 | 8/2015 | Abuodeh |
| 2015/0227980 A1 | 8/2015 | Eberhardt |
| 2015/0242810 A1* | 8/2015 | Rifai .................. H04W 4/025 |
| | | 705/26.3 |
| 2015/0248689 A1 | 9/2015 | Paul |
| 2015/0262121 A1* | 9/2015 | Riel-Dalpe ............ G06Q 50/12 |
| | | 705/15 |
| 2015/0301150 A1* | 10/2015 | Stuckman .......... G06Q 30/0619 |
| | | 342/407 |
| 2015/0310379 A1 | 10/2015 | Farrelly |
| 2015/0323332 A1 | 11/2015 | Lord |
| 2015/0323333 A1 | 11/2015 | Lord |
| 2015/0323334 A1 | 11/2015 | Lord |
| 2015/0324734 A1 | 11/2015 | Lord |
| 2015/0324735 A1 | 11/2015 | Lord |
| 2015/0324944 A1 | 11/2015 | Lord |
| 2015/0347964 A1 | 12/2015 | Taylor |
| 2015/0363843 A1 | 12/2015 | Loppatto |
| 2016/0012391 A1 | 1/2016 | Burnett |
| 2016/0012394 A1* | 1/2016 | Reed .................. G06Q 30/0635 |
| | | 705/26.81 |
| 2016/0019496 A1 | 1/2016 | Gorlin |
| 2016/0027079 A1 | 1/2016 | Schoeffler |
| 2016/0034845 A1 | 2/2016 | Hiyama |
| 2016/0035248 A1 | 2/2016 | Gibbs |
| 2016/0042303 A1 | 2/2016 | Medina |
| 2016/0078516 A1 | 3/2016 | Alnuwaysir |
| 2016/0092972 A1 | 3/2016 | Blatstein |
| 2016/0104112 A1 | 4/2016 | Gorlin |
| 2016/0104113 A1 | 4/2016 | Gorlin |
| 2016/0132792 A1 | 5/2016 | Rosnow |
| 2016/0140589 A1 | 5/2016 | Deshpande |
| 2016/0148306 A1 | 5/2016 | Bellavance |
| 2016/0171439 A1 | 6/2016 | Ladden |
| 2016/0171542 A1 | 6/2016 | Fanous |
| 2016/0171584 A1 | 6/2016 | Cao |
| 2016/0210591 A1 | 7/2016 | Lafrance |
| 2016/0307289 A1 | 10/2016 | Choski |
| 2016/0328669 A1 | 11/2016 | Droege |
| 2016/0353235 A1 | 12/2016 | Williams |
| 2017/0024789 A1 | 1/2017 | Frehn |
| 2017/0083862 A1 | 3/2017 | Loubriel |
| 2017/0093803 A1 | 3/2017 | Nayshtut |
| 2017/0116566 A1 | 4/2017 | Walton |
| 2017/0169385 A1* | 6/2017 | High .................. G06Q 10/083 |
| 2017/0178057 A1 | 6/2017 | Al Rifai |
| 2017/0270794 A1 | 9/2017 | Sweeney |
| 2017/0290345 A1 | 10/2017 | Garden |
| 2017/0337511 A1 | 11/2017 | Shroff |
| 2018/0025298 A1 | 1/2018 | Baggott |
| 2018/0067620 A1 | 3/2018 | Adler |
| 2018/0089621 A1 | 3/2018 | Perez Barrara |
| 2018/0253805 A1 | 5/2018 | Kelly |
| 2018/0157993 A1 | 6/2018 | Northrup |
| 2018/0188068 A1 | 7/2018 | Droege |
| 2018/0189729 A1 | 7/2018 | Droege |
| 2018/0202818 A1 | 7/2018 | Zhang |
| 2018/0225796 A1 | 8/2018 | Liu |
| 2018/0231984 A1 | 8/2018 | Alonso-Mora |
| 2018/0300660 A1 | 10/2018 | Coan |
| 2018/0308038 A1 | 10/2018 | Zhou |
| 2018/0336510 A1 | 11/2018 | DaCosta |
| 2019/0026662 A1 | 1/2019 | Kring |
| 2019/0035037 A1 | 1/2019 | Chase |
| 2019/0064801 A1 | 2/2019 | Frazzoli |
| 2019/0113361 A1 | 4/2019 | Droege |
| 2019/0114583 A1 | 4/2019 | Ripert |
| 2019/0130260 A1 | 5/2019 | Han |
| 2019/0130320 A1 | 5/2019 | Friend |
| 2019/0130350 A1 | 5/2019 | Nguyen |
| 2019/0130354 A1 | 5/2019 | Han |
| 2019/0132699 A1 | 5/2019 | Nikulkov |
| 2019/0132702 A1 | 5/2019 | Ehsani |
| 2019/0163710 A1 | 5/2019 | Haghighat Kashani |
| 2019/0205834 A1* | 7/2019 | Bell .................. G06Q 10/08355 |
| 2019/0289427 A1 | 9/2019 | Lin |
| 2019/0295440 A1 | 9/2019 | Hadad |
| 2020/0033156 A1 | 1/2020 | Droege |
| 2020/0065734 A1 | 2/2020 | Szybalski |
| 2020/0074524 A1 | 3/2020 | Smith |
| 2020/0090248 A1 | 3/2020 | Zeng |
| 2020/0151660 A1 | 5/2020 | Warr |
| 2020/0265366 A1 | 8/2020 | Mo |
| 2020/0311618 A1 | 10/2020 | Eichler |
| 2020/0333161 A1 | 10/2020 | Droege |
| 2020/0374650 A1 | 11/2020 | Jung |
| 2021/0081880 A1 | 3/2021 | Bivins |
| 2021/0224944 A1 | 7/2021 | Choski |

FOREIGN PATENT DOCUMENTS

| | | |
|---|---|---|
| KR | 10-2014-0101501 | 8/2014 |
| KR | 10-20170054739 | 5/2017 |
| WO | WO 2001052163 | 7/2001 |
| WO | 2014/030976 | 2/2014 |

(56) References Cited

FOREIGN PATENT DOCUMENTS

WO    WO 2017/148202    9/2017
WO    WO 2018/209263    11/2018

OTHER PUBLICATIONS

ISR and Written Opinion in PCT/US2018/058554 dated Feb. 13, 2019.
ISR and Written Opinion in PCT/US2018/058859 dated Feb. 20, 2019.
Reutt, Alex "Deliveroo Frank About Improved Algorithm Improving Service Times by 31%", Oct. 17, 2017 (https://www.itwire.com/home-it/80398-deliveroo-frank-about-improved-algorithm-improving-service-times-by-31.html).
Mabe, John, The 'Uber-for-X Model' and the Complexity of On-Demand Delivery, Techgistics, Dec. 1, 2016.
Singliar, Tomas, Demand Forecasting for Shipping and Distribution, Azure AI Gallery, Jun. 26, 2017.
Chen, P., Crowdsourced Delivery for Last-Mile Distribution: An Agent-Based Modeling and Simulation Approach, IEEE, 2017.
IPRP dated Aug. 25, 2020 in PCT/US2019/051993.
Written Opinion in PCT/US2018/058859 dated Oct. 21, 2019.
IPRP dated Nov. 7, 2019 in PCT/US2018/058554.
Technological Disruption and Innovation in Last-Mile Delivery, Stanford Value Chain Innovation Initiative, Stanford, Jun. 2016.
Collaborative Urban Logistics: Synchronized Last-Mile Logistics for Sustainable, Efficient Urban Delivery, TLI Asia Pacific White Paper Series, vol. 13, Nov. 2013.
Grand Junction Local Delivery Reinvented—Last Mile Platform Help, Grand Junction Inc., PerfectLastMile.com, 2016.
Computerised Vehicle Routing and Scheduling (CVRS) for Efficient Logistics, Department for Transport, 2005.
ISR and Written Opinion in PCT/US2019/051993 dated Sep. 19, 2019.
HungryBBQ Delivery Details, Sep. 11, 2019 www.hungrybbq.com/delivery_info.php.
Eatzcatering FAQ, Nov. 13, 2018 www.eatzcatering.com.
U.S. Appl. No. 15/491,932, Office Action dated Sep. 18, 2019, 18 pages.
U.S. Appl. No. 15/491,932, Office Action dated Mar. 10, 2020, 22 pages.
U.S. Appl. No. 15/491,932, Advisory Action dated May 19, 2020, 3 pages.
U.S. Appl. No. 15/491,932, Office Action dated Jan. 4, 2021, 23 pages.
U.S. Appl. No. 15/491,932, Office Action dated Aug. 6, 2021, 24 pages.
U.S. Appl. No. 15/491,932, Advisory Action dated Oct. 21, 2021, 3 pages.
PCT International Preliminary Report on Patentability in Application PCT/US2016/027869, dated Oct. 26, 2017, 9 pages.
PCT International Preliminary Report on Patentability in PCT/US2018/058859, dated Jan. 20, 2020, 20 pages.
PCT International Search Report and Written Opinion issued in PCT/US2016/027869 dated Jul. 20, 2016, 10 pages.
U.S. Appl. No. 15/130,018, Advisory Action dated Aug. 18, 2020, 3 pages.
U.S. Appl. No. 15/130,018, Notice of Allowance dated Jan. 27, 2021, 9 pages.
U.S. Appl. No. 15/130,018, Office Action dated Jan. 24, 2020, 28 pages.
U.S. Appl. No. 15/130,018, Office Action dated May 4, 2020, 33 pages.
U.S. Appl. No. 15/802,385, Office Action dated Jan. 7, 2020, 33 pages.
U.S. Appl. No. 15/802,385, Office Action dated Jul. 30, 2020, 39 pages.
U.S. Appl. No. 15/802,391, Office Action dated Dec. 12, 2019, 30 pages.
U.S. Appl. No. 15/802,391, Office Action dated Mar. 26, 2020, 35 pages.
U.S. Appl. No. 15/802,394, Office Action dated Nov. 22, 2019, 26 pages.
U.S. Appl. No. 15/802,394, Office Action dated Mar. 30, 2020, 27 pages.
U.S. Appl. No. 15/802,395, Office Action dated Feb. 2, 2021, 25 pages.
U.S. Appl. No. 15/802,395, Office Action dated Jun. 26, 2020, 22 pages.
U.S. Appl. No. 16/365,553, Office Action dated Nov. 18, 2020, 34 pages.
U.S. Appl. No. 16/365,553, Office Action dated Apr. 12, 2021, 32 pages.
U.S. Appl. No. 16/365,553, Office Action dated Jul. 26, 2021, 34 pages.
U.S. Appl. No. 16/111,013, Office Action dated Jul. 2, 2020, 33 pages.
U.S. Appl. No. 16/111,013, Office Action dated May 3, 2021, 24 pages.
U.S. Appl. No. 16/111,013, Office Action dated Jul. 9, 2021, 25 pages.

* cited by examiner

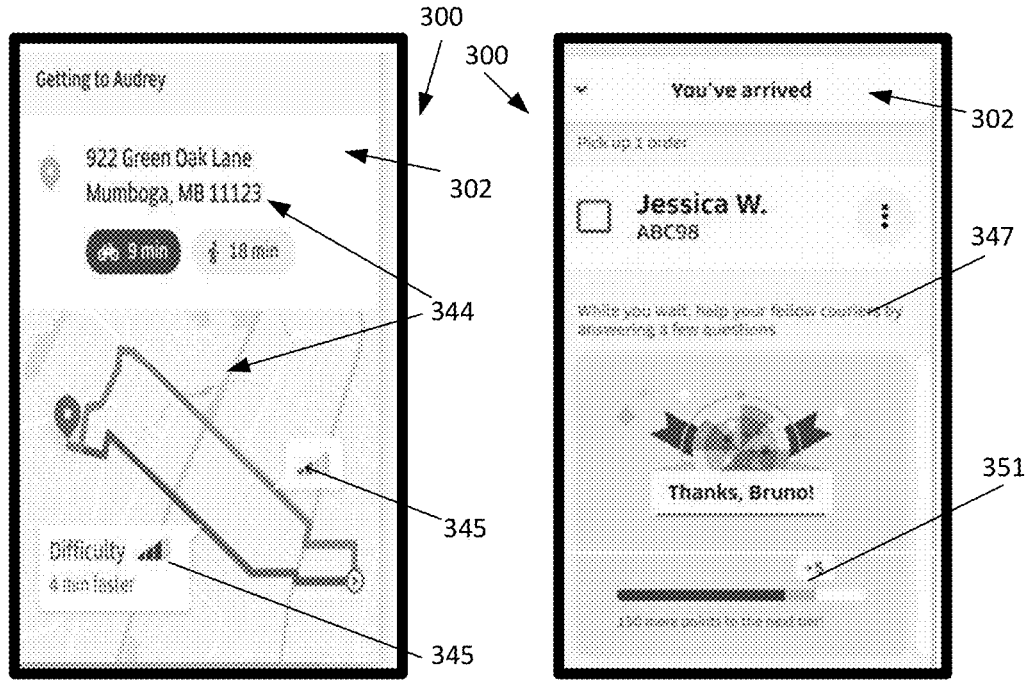
FIG. 3E
FIG. 3F
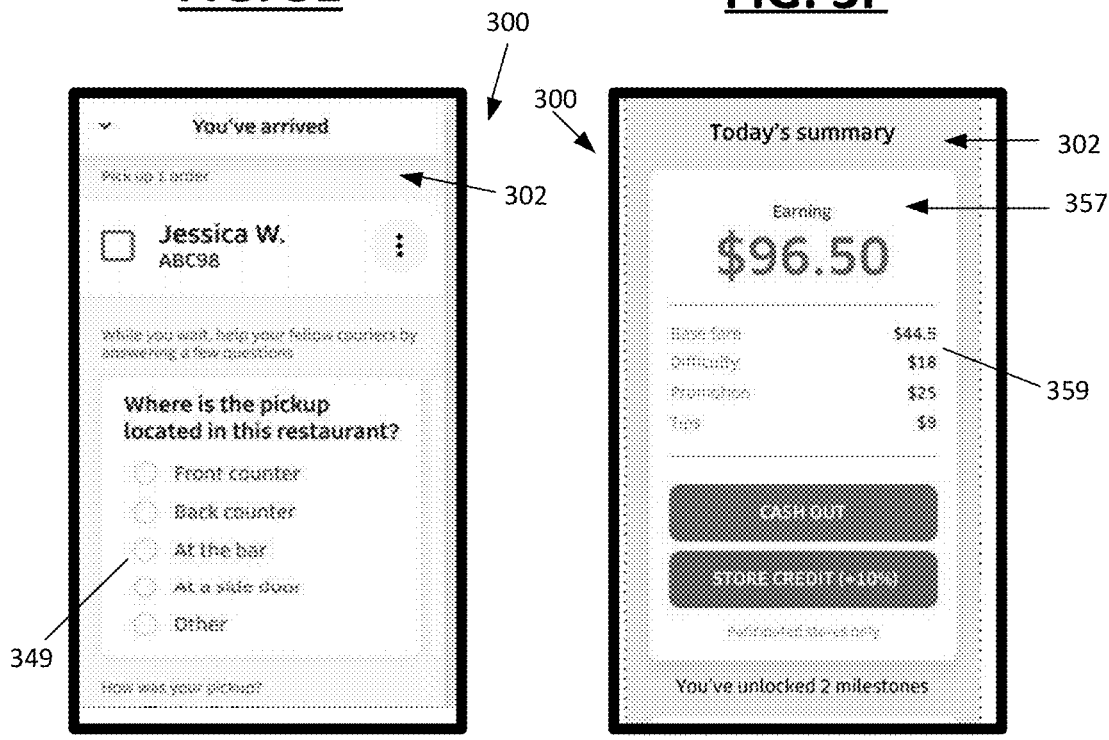
FIG. 3G
FIG. 3H

NETWORK COMPUTER SYSTEM TO MAKE EFFORT-BASED DETERMINATIONS FOR DELIVERY ORDERS

TECHNICAL FIELD

Examples described herein relate to a network computing system for making effort-based determinations for delivering orders.

BACKGROUND

Numerous on-demand services exist to offer users a variety of services: transportation, shipping, food delivery, groceries, pet sitting, mobilized task force and other types of service. Typically, on-demand services leverage resources available through mobile devices, such as wireless (e.g., cellular telephony) devices, which offer developers a platform that can access sensors and other resources available through the mobile device. Many on-demand services include dedicated applications (sometimes referred to as "apps") to communicate with a network service through which an on-demand service is offered.

BRIEF DESCRIPTION OF THE DRAWINGS

FIG. 3A through FIG. 3L illustrate example interfaces for use by users of an on-demand delivery system.

DETAILED DESCRIPTION

Figure 1:
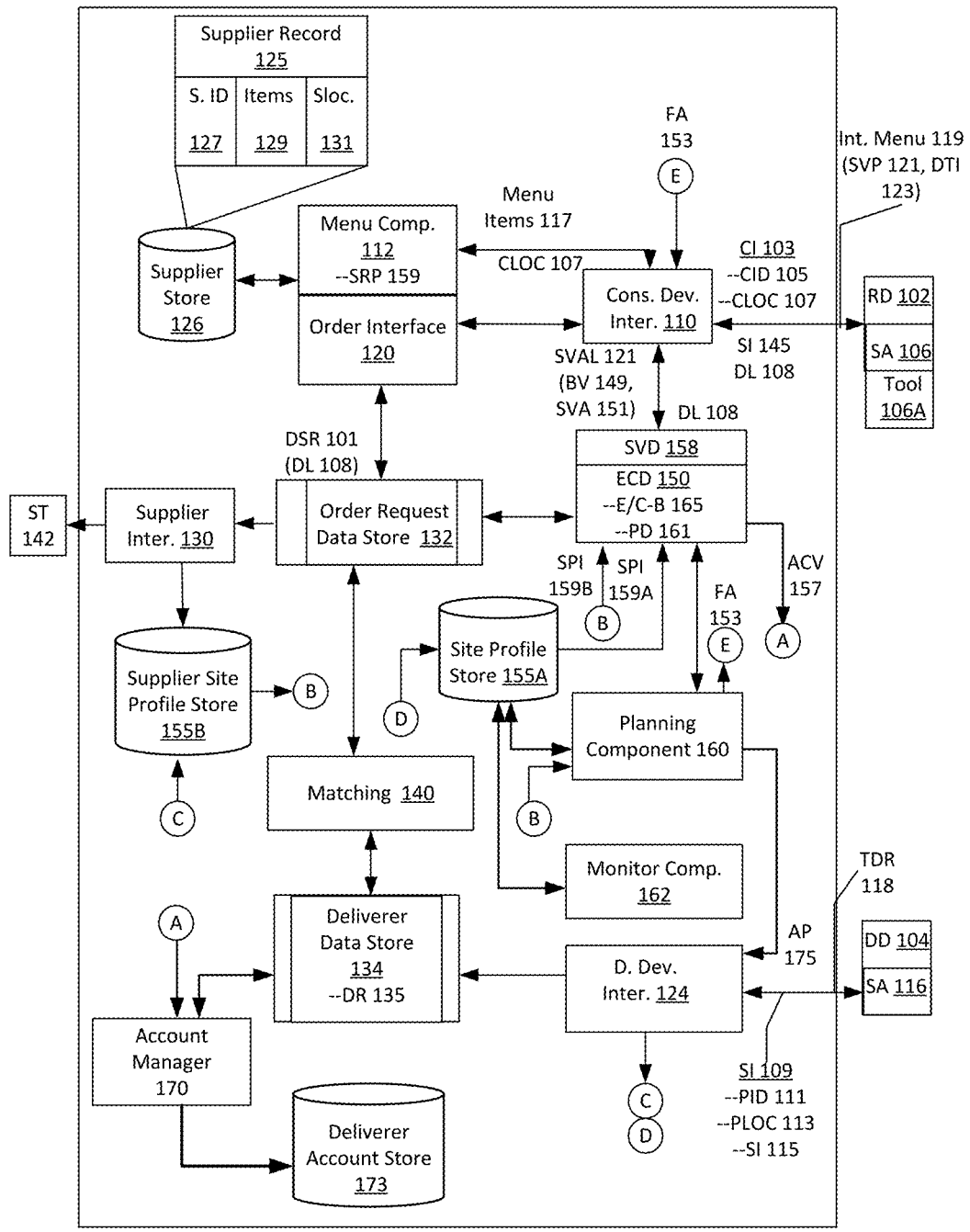
FIG. 1 illustrates a network computing system to make effort-based determinations in connection with delivering order requests, according to one or more examples.

Examples provide for a network computer system that determines metrics related to effort and cost on the part of deliverers of delivery orders. In some examples, the network computer system operates to mitigate or reduce effort and/or cost on the part of the deliverers. In other variations, the network computer system performs operations such as arranging transport and selecting deliverers based at least in part on determinations of effort and cost for individual deliveries.

In some examples, a network computer system determines a cost of a delivery order to a requester (e.g., consumer) based on an estimated or determined level of effort that is required to complete the requester's delivery order. The level of effort can reflect the expected or measured level of effort on the part of the deliverer following the deliver's arrival to a site (e.g., deliverer nears an apartment building of the requester, or reaches a city block where requester is located). As examples, the effort level may be tied to exertion, which can result from changes in altitude, distance the deliverer walks, size of the food order, environmental conditions, etc. The network computer system can detect exertion using, for example, topographical maps (e.g., indicating elevation from hills or stairs) and sensor information (e.g., accelerometer to indicate elevation change, heart monitor).

In other examples, the network computer system can determine the level of effort to reflect the presence of barriers at the site of the requester, where the barrier is expected or determined to delay or hinder the deliverer. As examples, barriers can include exterior building doors that require a person to open from the inside, elevators, doormen, etc.

The network computer system can detect numerous other metrics that reflect effort, such as timing parameters that reflect an amount of time the deliverer used to park a vehicle, walk through the site, and/or wait for the requester. Likewise, context (e.g., time, weather), and type of order (e.g., heavy) can impact the determination of effort level. Still further, in other examples, the mobile computing device of the deliverer can be monitored to detect whether the deliverer had to exit the vehicle to complete the delivery (rather than have the requester meet the deliverer at the vehicle).

In some examples, the requester is provided advance information about the added charge for effort, and the reason for the added charge (e.g., "Because you live in a locked apartment building, there is an added charge to your order."). In such examples, the requester can be provided a suggestion, which would reduce the cost of the delivery order (e.g., "If you meet the deliverer, you will be charged less."). In other variations, the requester can be provided an interface that enables him or her to create messages, images or other information to reduce the effort of the deliverer. For example, the requester can upload and edit an image for the deliverer, identifying a location where the deliverer can drop-off the order, rather than wait for entry.

The term "delivery site" in context of a delivery or other transportation service, is intended to mean a sub-region that encompasses a delivery location, where one form of transport (e.g., vehicular) can terminate and another form of transport (e.g., ambulatory) can initiate. The term "supplier site" is intended to mean a sub-region that encompasses a suppler location, where one form of transport (e.g., vehicular transport) can transition to another form of transport (e.g., ambulatory), in order for the deliverer to arrive at a location of the supplier for items of a delivery request. A target site can encompass either of a delivery site or a supplier site. By way of examples, the respective delivery or supplier sites can correspond to a city block or half-block, a building, or a building complex. In many examples, vehicular transport is used to reach a target site, and ambulatory transport is used to reach the destination (or drop-off) location of the delivery request.

A "deliverer" can include, for example, a transport or deliverer.

As used herein, a client device refers to devices corresponding to desktop computers, cellular devices or smartphones, wearable devices, laptop computers, tablet devices, television (IP Television), etc., that can provide network connectivity and processing resources for communicating with the system over a network.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates a network computing system to make effort-based determinations in connection with delivering order requests, according to one or more examples. In particular, a network computing system 100 can implement processes to determine an amount of effort involved with respect to delivering an order request. The system 100 can further determine a service value for a transport provider in delivering an order request to a requesting requester.

With respect to examples as described, the system 100 can be implemented on a server, on a combination of servers, and/or on a distributed set of computing devices which communicate over a network such as the Internet. Still further, some examples provide for the network computing system 100 to be distributed using one or more servers and/or mobile devices. In some variations, the network computing system 100 is implemented as part of, or in connection with a network system, where, for example, operators use service vehicles to provide transport-related services between locations. In variations, the network computing system 100 may be implemented using mobile devices of users, including delivery personnel (or "deliverers") such as deliverers, as well as other users (e.g., "requesters" of delivery orders), with the individual devices executing a corresponding service application that causes the computing device to operate as an information inlet and/or outlet for the network computing system 100.

In some examples, the system 100 implements a network platform, in connection with applications that run on mobile devices of the population of users. The users can include those who order items from the delivery service through their respective computing device ("requesting requester"), as well as those who receive items from the delivery service as part of a group (collectively termed "requesters" in examples as described). The users can also include suppliers, which can include, for example, operators of restaurants, stores which provide prepared foods, and food preparers (e.g., independent chefs operating in professional kitchens). The providers can alternatively include individuals and fleet operators who provide transport service, such as in connection with delivery orders.

With reference to an example of FIG. 1, the system 100 includes a requester device interface 110, an order interface 120, a deliverer device interface 124, a supplier interface 130, a matching component 140, and an effort cost determination ("ECD") component 150. In variations, the ECD component 150 can include or utilize a service value determination ("SVD") component 158. Additionally, the system 100 can include one or multiple data stores which maintain information about requesters, suppliers, and deliverers. As described by some examples, the system 100 can be implemented in connection with a delivery service which enables requesters in a geographic region to request food items from suppliers (e.g., restaurants) for delivery to their respective locations. In variations, the system 100 can be implemented in connection with a delivery service to deliver any kind of product or item, such as shipments (e.g., couriered packages), dry cleaning, or groceries.

The SVD component 158 may determine a service value charge 121 for delivery of an ordered item, where the service value is determined based in part on one or more metrics that represent a level of effort or cost that is expended, or which may be expended by a deliverer in delivering an ordered item. In examples, the SVD component 158 can determine the service value charge 121 based in part on one or more metrics that are independent of a distance or time of travel as between a location of the food preparation source and the target site of the requester. In examples, the service value charge 121 represents a complete service charge or provide for delivery of the ordered item. In such examples, the service value charge 121 includes a base value 149, which can be determined based on, for example, a time or distance of travel for a deliverer, as well as other factors (e.g., availability of deliverers). In variations, the service value charge 121 as determined by the SVD component 158 can include a surcharge or adjustment to a base value 149, where the base value 149 is determined by a setting (e.g., flat-fee), predetermined based on supplier-specific factors (e.g., location of supplier, requirements of supplier), or determined through a separate programmatic mechanism.

The requester device interface 110 includes or performs processes that run on the network-side of the system 100 to establish communication channels with individual devices of requesters. The requesters may operate mobile devices (represented in FIG. 1 by the requester device 102) on which a corresponding service application 106 may execute. The requesters may operate respective service applications 106 to request delivery services, and in some variations, other types transport-related services, such as human transport between start and drop-off locations.

The deliverer device interface 124 includes or performs processes that run on the network-side of the system 100 to establish communication channels with individual devices of deliverers. For example, the deliverer device interface 124 can establish secure sockets with different types of mobile devices, which deliverers of the system 100 can utilize when delivering orders and providing other services using their respective vehicles. In some examples, the deliverers operate mobile devices (represented in FIG. 1 by the mobile device 104) on which a corresponding service application 116 may be operated. Among other functionality, the service application 116 can automate operations which include indicating the availability of the deliverer to provide service, communicate location information to enable the system 100 to monitor the location of the deliverer's vehicle, receive information from the system 100 to facilitate the deliverer in receiving order requests and fulfilling order requests, as well as communicating information to the system 100 for various purposes.

According to some examples, the deliverer device 104 initiates communications with the system 100 using the deliverer service application 116. The service application 116 may correspond to a program (e.g., a set of instructions or code) that is downloaded and stored on the mobile device 104 of the deliverer. The deliverer can launch the service application 116 to utilize the system 100, and specifically to receive transport delivery requests 118, and/or another type of service requests (e.g., transport requests). The deliverer may operate a service vehicle to fulfill a transport delivery request 118. Once the communication channel is established by the deliverer device 104 using the service application 116, the deliverer device 104 may repeatedly or continuously communicate service information 109 to the network computing system 100. The service information 109 may include the deliverer's identifier 111, as well as the deliverer's current location 113, which may be determined by the service application interfacing with a satellite receiver of the deliverer device 104.

The system 100 may include an active deliverer data store 134 that maintains records 135 that associate individual deliverers with their respective current location and service status. By way of example, each deliverer may start a shift by operating the service application 116 (e.g., opening the application on the deliverer's device 104), and then toggling a state feature provided by the service application 116 to 'on duty'. The service application 116 communicates the activation of the state feature to the system 100 via the deliverer device interface 124. The deliverer device interface 124 processes the service information 109 received from individual deliverers. For each deliverer, the deliverer device interface 124 extracts and stores the current location 113 of the deliverer device 104 with the deliverer's identifier 111 in the deliverer status store 134. As the deliverer's location changes (e.g., with the movement of the deliverer's vehicle), subsequent communications from the deliverer device 104 via the deliverer device interface 124 can be used to update the deliverer status store 134. In this way, the deliverer data store 134 may reflect the most current location of each deliverer.

In some examples, the requester device interface 110 and the deliverer device interface 124 can each include or use an application programming interface (API), such as an externally facing API, to communicate data with the requester and deliverer devices 102, 104, respectively. By providing the externally facing API, the system 100 can establish secure communication channels via secure access channels over the network through any number of methods, such as web-based forms, programmatic access via RESTful APIs, Simple Object Access Protocol (SOAP), remote procedure call (RPC), scripting access, etc.

The supplier interface 130 may correspond to a programmatic interface that transmits order requests from requesters to a terminal of a supplier (shown as supplier terminal 142). The context of food delivery, the supplier interface 130 transmits delivery orders to a computer system (e.g., reservation ordering system, point-of-sale device, dedicated take-out terminal, etc.) of the supplier.

The system 100 may maintain a supplier profile store 126, which includes a record 125 for each supplier. Each supplier record 125 may associate a respective supplier with an account identifier 127, as well as a supplier location 131 and a set of deliverable items 129 provided by that supplier. The supplier may specify the deliverable items 129 via the supplier interface 130. The deliverable items 129 may be provided as an electronic document, or combination of records provided by the supplier, which can be retrievable and rendered on a requester device 102 in the form of, for example, an interactive menu. By way of example, the supplier items 129 can be in the form of a restaurant menu, or items for a restaurant menu.

According to examples, the requester device 102 may a generate a session request to the requester device interface 110 to initiate an order session. For example, the service application 106 can generate the order session when launched. The requester device 102 can also transmit requester information 103 to the 110, where the requester information 103 includes an account identifier 105 and the current location 107 of the requester device 102. Once the order session is initiated, the menu component 112 uses the current location 107 of the requester to retrieve menu items 117 from the supplier profile store 126, representing a selection of deliverable items 129 from one or more suppliers that satisfy a set of selection criteria for the requester. For example, the menu component 112 can utilize a service range parameter 159 to filter suppliers for the order session, where the service range parameter 159 defines a maximum threshold distance (e.g., Haversine distance, travel distance) between the respective location of selected suppliers and the delivery location for the order session. Accordingly, the menu component 112 may use the service range parameter 159 in selecting suppliers, from which menu items 117 can be selected.

The requester device interface 110 may communicate interactive menu 119 to the requester device 102, via the service application 106, based on the menu items 117 that match to the current location of the requester. As described with some examples below, the interactive menu 119 may also communicate one or more service value parameters 121, indicating a price, charge or consideration which the requester will incur for receiving delivery of a requested item from the supplier. The service value parameters 121 can reflect a service value for a delivery order that is based at least in part on a distance or time of travel from a location of the supplier to the site of the requester. The service value charge 121 can be provided with the interactive menu for an entire order request, or for a portion of an order request. As described by various examples, the service value charge 121 that is published on the menu can be provided as an estimate and/or as a range between a high and low service value. Still further, the service value charge 121 can be dynamic, meaning the value published to the requester can change based on information provided by the requester, and/or based on information determined from the requester over the course of a delivery.

In other examples, the interactive menu 119 may communicate delivery time information 123, indicating a duration between the time the user completes an order request and the predicted time until which the corresponding delivery request arrives at the location. As described with other examples, the delivery time information 123 can be determined based in part on an estimated duration for the supplier to prepare a given item or the items of a delivery order. Additionally, the delivery time information 123 can include an estimate duration for transporting a delivery order from a location of the supplier to the requester. As described with some examples, the delivery time information 123 can be determined from monitoring order requests (e.g. using monitoring component 162) provided to the supplier in preceding time intervals, models (e.g., stochastic models) that use relevant historical information for the supplier and/or predicted transport times.

The requester can browse through the interactive menu 119 to view a list of suppliers, and view information about food items which each available supplier has available for use with a delivery service of system 100. For example, the requester can perform searches of the interactive menu 119 using terms that relate to a food item (e.g., burger), a food type or genre, a price range or other designation. The requester's search can also include location information, which may be automatically provided by the service application. In other variations, the requester may provide the location information in order to search food items that are offered with a delivery service at another location.

The menu content can respond to the searches by rendering matching menu items, sorted by relevance, supplier and/or other parameter. The service application 106 may enable the user to interact with the menu on the requester device 102, in order to select items for a delivery order. Upon making a selection, the service application 106 may cause the requester device 102 to transmit a corresponding selection input 145. The order interface 120 can process the selection input 145 by placing the selected menu item in a checkout queue for the requester. The requester may next signal completion of an order. The order interface 120 can place the delivery service request 101 with the request data store 132. The delivery service request 101 can identify each item the requester selected, the supplier the item was selected from, and the delivery location for the order request. Additionally, the order interface 120 can determine a delivery location 108 for the delivery service request 101. The delivery location 108 can correspond to the current location 107, as determined by, for example, the service application 106 interfacing with a satellite receiver of the requester device 102. As an addition or alternative, the delivery location 108 can be determined from user-input and/or a user profile (e.g., prior delivery locations of the requester or the requester's residence).

When the delivery service request 101 is determined, the matching component 140 can initiate a matching process to select a deliverer for the delivery service request 101. In an example of FIG. 1, the delivery service request 101 can be maintained and monitored in a delivery request store. The matching component 140 may match the delivery service request 101 to an available deliverer based at least in part on the current location of individual deliverers with respect to the location of the supplier. In some variations, the matching component 140 may also match the delivery service request 101 based on a characteristic of an order request, such as the volume or weight of the delivery service request 101. To illustrate, the matching component 140 may select a deliverer who utilizes a vehicle and not a bicycle when the items of the order request exceed a given size. In some variations, the matching component 140 may also select the deliverer based on information determined from the site profile of the requesting requester. For example, if the site profile indicates that parking is sparse or difficult about the site of the requesting requester, the matching component 140 may favor selection of a bicycle deliverer, in place of a vehicle deliverer.

In examples, the ECD component 150 can determine one or more parametric values that reflects an amount of effort or cost on the part of the deliverer in delivering a delivery order to a requester. In some examples, the determinations of effort and/or cost can be used to determine a service value (e.g., price or charge for providing delivery) for the requester. For example, ECD component 150 can implement the SVD component 158 to determine a service value adjustment 151 with respect to a service value charge of a delivery order, based on determination of effort and cast by the ECD component. As determined by various examples, the service value adjustment 151 can be based on determinations of effort and/or cost.

As an addition or variation, the SVD component 158 can determine a deliverer award or compensation value 157 for deliverer. The award or compensation value 157 can represent, or otherwise correlate to a monetary compensation amount that can be provided to a deliverer, where the award or compensation value 157 can correlate or be determined in part from the amount of effort or cost that the deliverer expended in performing a delivery, or one or more tasks (e.g., pick up delivery items, drop-off delivery items, etc.) of a given delivery. In some variations, the determination of the award or compensation value 157 can be independent of the service value that is charged to the requester.

In examples, the system 100 can include an account manager 170 that receives the award or compensation value 157 as determined by the SVD component 158. In examples, the account manager 170 can access a deliverer account store 173 in order to transfer credit or other types of compensation to the deliverer, based at least in part on the determined award or compensation value 157 for the deliverer.

In some examples, the award or compensation value 157 can be tied to the service value adjustment 151, as determined by the SVD component 158. In variations, the award or compensation value 157 is determined independently, or without consideration of the service value adjustment 151. For example, the ECD component 150 can determine a set of effort or cost parameters, reflecting an amount of effort or cost that the deliverer expended in connection with the deliverer picking up a delivery item or order from a supplier location 131. Additionally, in examples, the system 100 can implement processes to determine the effort or cost on the part of the deliverer to complete the pick up of the delivery order. However, the system 100 can be implemented to not allocate any service value adjustment 151 to the requester as a result of the supplier site causing the deliverer to expend additional effort or cost to pick up the items of the delivery order.

Determination of Effort by Deliverer

In examples, the ECD component 150 can determine a set of effort- and/or cost-based parameters 165 ("E/C-B parameter(s) 165") associated with a delivery of a delivery order. In examples, E/C-B parameter(s) 165 can reflect a duration, length, difficulty (e.g., exertion or required skill level), or cost for completing a delivery or delivery task using a particular type of transport. In more specific examples, E/C-B parameter(s) 165 can characterize an ambulatory portion of a delivery, at either the supplier or deliverer site, where the characterization may be specific as to duration (e.g., distance or duration of walk), exertion level (e.g., uphill or downhill walking) and/or difficulty. Likewise, E/C-B parameter(s) 165 can reflect a duration or difficulty of other modes of transport, as well as for the occurrence of other types of events (other than the deliverer traveling to the supplier location 131 and/or delivery location 108).

In examples, some kinds of delivery events can be predefined, such as to include an event coinciding with the deliverer initiating a search to park or stop a vehicle, in order to complete a task of the delivery order assignment (e.g., pick up items of delivery order at supplier location 131 and/or deliver items to requester at delivery location 108). As another example, a predefined delivery event can be defined for ambulatory efforts on the part of the deliverer, such as for the deliverer to walk from where the deliverer's vehicle has been parked to the supplier location 131 and/or to the delivery site or location 108.

As another example, a predefined delivery event can be defined for other impediments or barriers that the deliverer may encounter that can delay or make completion of the delivery task more difficult. By way of example, such predefined delivery events may include: (i) presence of exterior doors that require remote unlocking by the requester; (ii) presence of barriers that require the presence of the requester or other person (e.g., requester to meet deliverer at external door or lobby); (iii) presence of elevators or escalators that can delay the arrival of the deliverer at the target; (iv) presence of stairs (e.g., as entry stairs, stairwells to change floors, etc.) that can cause added exertion on the part of the deliverer; (v) presence of walkways that are at a grade, which can cause added exertion; (vi) interior navigation (e.g., within a building or mall) before deliverer reaches the target; and/or (vii) other site specific impediments or barriers that can cause delay or added effort on the part of the deliverer when completing a delivery task.

To estimate the E/C-B parameter(s) 165 for a given target, the ECD component 150 can utilize information that is known about a corresponding target site where the delivery is to be received. In examples, ECD component 150 can utilize a delivery site profile data store 155A to determine delivery site information 159A about a delivery location 108. In examples, the ECD component 150 can use the address (or other identifier) of the delivery location 108 to retrieve delivery site information 159A for the delivery location. The delivery site information 159A can identify features of the delivery site that are noteworthy or otherwise relevant to the determination of the E/C-B parameter(s) 165. Thus, the delivery site information 159A can identify features that are relevant to causing delay (or potential delay), physical exertion, or otherwise being a feature that can be acted on in a particular way to minimize effort. To illustrate, the delivery site information 159A can identify external site features, such as a type of building where the delivery location is located (e.g., multi-tenant building, office building, single-household or dwelling), as well as entrances to the building, a topography of the delivery location (e.g., elevated or graded sidewalks or paths to delivery location), as well as other noteworthy features, including predefined impediments or barriers that the deliverer may encounter at or on-route to the delivery site (e.g., external door requiring escort or requester action, doorman). The delivery site information 159A can also identify interior features of the delivery site (e.g., building), such as the presence of elevators, stairwells, security check-in, or an internal mapping that can locate the delivery location 108. Additionally, the delivery site information 159A can also identify vehicle stoppage features, such as location of available parking or vehicle stopping places (e.g., specific parking lot or parking area, entrance or route to the parking spot, presence of loading or unloading regions, charge for parking space, etc.). In variations, the delivery site information 159A can identify numerous other predefined features which can be identified to the deliverer, and/or communicated in context of instructions, for purpose of enabling the deliverer to minimize time, effort and/or cost when completing a delivery at the delivery site. By way of example, the delivery site information 159A can specify a submap and/or navigation instructions, to enable the deliverer to traverse through a building or region to arrive at the delivery location 108.

Likewise, to estimate E/C-B parameter(s) 165 for delivery requests that specify a given supplier location 131, the ECD component 150 can utilize information that is known about the supplier site. In examples, ECD component 150 may utilize a supplier profile store 155B to determine supplier site information 159B about a supplier location 131. In particular, the supplier site profile store 155B can correlate the supplier location 131 to a set of features that identify impediments, or potential impediments, with respect to the ability of the deliverer to minimize the amount of time or effort expended in picking-up delivery items from the supplier location 131. The supplier site information 159B can specify features (e.g., location of parking spots that the deliverer can use) and instructions (e.g., use the back entrance to the restaurant to pick up food) to further the objective of minimizing the amount of time or effort expended to pick up a delivery order. In examples, the supplier site information 159B can identify a particular topography, a set of ambulatory impediments and obstacles (e.g., navigation within a shopping mall), a submap of the regions surrounding the supplier location 131 and/or available parking places.

Additionally, each of the delivery and supplier site profile stores 155A, 155B can also be associated with historical delivery data that can separately correlate to one or more parameters of E/C-B parameter(s) 165. The historical delivery data can identify, for example, an amount of time and/or effort that deliverers have previously expended in walking to a supplier location 131 or delivery location 108. As described with other examples, the historical delivery data can be determined by processes that programmatically monitor (e.g., monitoring component 162) deliverers as the deliverers pick up delivery items and/or make deliveries. Still further, the historical delivery data can be determined from feedback provided by deliverers with respect to, for example, the supplier location 131 and/or the delivery location 108.

The ECD component 150 can use the delivery site profile information 159A, 159B available from the respective delivery and supplier site profile data stores 155A, 155B to estimate, for example, a proximity of parking lots to the supplier location 131 and/or to the delivery location 108. The historical delivery data can be used to determine, for example, an availability of parking spots at individual parking lots and/or at various locations about one of the supplier or delivery sites. Still further, the historical delivery data can be used to determine a cost for parking at a given parking space or location. Still further, in other variations, ECD component 150 can use the historical delivery data to determine the difficulty of the deliverer in finding parking, based on, for example, the amount of time prior deliverers have needed to find parking.

In examples, ECD component 150 can estimate the ambulatory requirements of a given delivery based on the estimated proximity of parking lots or spaces to the to the respective supplier location 131 and/or to the delivery location 108. In variations, ECD component 150 can further determine an amount of exertion associated with a segment of the estimated ambulatory portion of the delivery, using, for example, topographical information provided with the target site profile data stores 155A, 155B. In such examples, the topographic information can identify elevational changes at either of the delivery or pick up sites. For example, ECD component 150 may identify possible walking routes of the deliverer which encounter elevational changes, such as a hill or series of steps. ECD component 150 can further use historical delivery information to identify elevational changes, as well as other impediments at either of the target sites which can impede, or delay the deliverer's advance to the supplier site 131 and/or delivery location 108. By way of example, the delivery profile store 155A can record historical delivery information that identifies impediments such (i) exterior doors that must be remotely unlocked by the requester before the interior of a building can be accessed by the deliverer; (ii) elevators and/or security desks which may delay the advance of the deliverer within the building of the delivery location. Similarly, the supplier profile store 155B can reflect the supplier location 131 being situated within, for example, a building or mall with other businesses, requiring the deliverer to know sub-directions to readily locate the supplier location 131.

Still further, in examples, ECD component 150 can use known information determined from, for example, the delivery and/or supplier site profile data stores 155A, 155B to estimate a cost associated with the delivery order. For example, the delivery and/or supplier site profile data stores 155A, 155B can reflect parking charges for parking in the parking lots that are near or otherwise likely to be used by the deliverer at the supplier location 131 and/or delivery location 108.

In variations, the ECD component 150 can make predictive determinations as to the values of E/C-B parameter(s) 165. In examples, the ECD component 150 can use the information of the delivery or supplier site profile data stores 155A, 155B, as well as historical information accumulated from prior deliveries, to predict values for the E/C-B parameter(s) 165 in advance of the deliverer performing a corresponding task of the delivery (e.g., parking vehicle and/or walking to supplier location 131 to pick up delivery order, parking vehicle and/or walking to delivery location 108). Accordingly, the ECD component 150 can use rule-based logic to determine values for the E/C-B parameter(s) 165 (e.g., using averages or weighted averages). In variations, the ECD component 150 can use predictive models to predict the values for one or more of the E/C-B parameter(s) 165, based on historical values as determined from monitoring of prior deliverers who pick-up delivery items from a same supplier site or deliver to a same delivery site. Still further the ECD component 150 may use machine learning, as well as historical information about prior deliveries, in combination with obtaining feedback and/or monitoring of current or recently completed deliveries.

Still further, the ECD component 150 can also utilize contextual information when predicting values for the E/C-B parameter(s) 165. To illustrate, for a current delivery (e.g., delivery to be initiated or in-progress), contextual information can be obtained relating to timing (e.g., time of day, day of week, month, etc.), weather or other environmental conditions, and traffic. In predicting the E/C-B parameter(s) 165, for example, the ECD component 150 can apply contextual parameters, using contextual information recorded with past deliveries of the relevant historical information.

In variations, the ECD component 150 can make predictions related to site-specific conditions. For example, the ECD component 150 can predict the impact parking conditions, site barriers, and/or ambulatory requirements of a particular target site have on effort and/or cost for the deliverer. In making such predictions, the ECD component 150 can utilize known information (e.g., such as provided with the delivery and supplier site profile data stores 155A, 155B) as well as other information, such as contextual information that has previously been recorded for deliveries to specific sites and locations.

In examples, the ECD component 150 can implement one or more models to determine an expected arrival time for deliverer to arrive at one of the target locations (e.g., supplier location 131, delivery location 108). In examples, the ECD component 150 can base the determination of delivery time or duration on one or multiple ambulatory portions of the delivery. The ECD component 150 can also make a statistical determination as to a duration and/or cost for the deliverer's parking, prior to initiating the ambulatory portion of the delivery. The ECD component 150 can also make a predictive determination as to a walking length or distance from the parking location or site where the deliverer is likely to park his or her car. In this way, the ECD component 150 can make determinations relating to parking based on target or location specific information, as provided by the respective delivery or supplier site profile data store(s) 155A, 155B. The ECD component 150 can also utilize relevant historical data, as determined from prior arrivals to the particular target site, as well as contextual information that may have been recorded in association with the prior arrivals.

Among other predictive determinations, the ECD component 150 can estimate the duration that the deliverer will need to walk to a building of the delivery location 108, and further to navigate within the building to the delivery location 108. Still further, the predictive determinations of the ECD component 150 can correspond to a range of values, such as a range of time that represents the shortest duration (or best case) and/or longest duration (or worst case) for the deliverer to traverse the delivery or supplier site.

In similar fashion, the ECD component 150 can predict a duration or length of the ambulatory portion of a given delivery. In examples, the duration or length of the ambulatory portion of the delivery can be based in part on the likelihood that the deliverer will be able to park at particular locations (e.g., near the building, at a specific parking lot across the street from the supplier location 131 or delivery location 108, etc.). The ECD component 150 can make a statistical determination that reflects a likelihood that a deliverer will be able to park his or her vehicle at specific parking spots and/or lots, where the parking lots or spots are identifiable from respective delivery and/or supplier site profile stores 155A, 155B. Alternatively, the statistical determination can reflect a likelihood that the deliverer will be able to find a parking location that is within one or more threshold distances (e.g., near proximity, medium proximity, far proximity).

As an alternative or addition, the ECD component 150 can also include processes to predict a cost for the deliverer to park a vehicle, in connection with the deliverer traversing the supplier or delivery site to reach the respective supplier location 131 or delivery location 108. In variations, the ECD component 150 can make a statistical determination to reflect a likelihood that the deliverer will be able to find a parking space at a particular cost, or cost threshold. For example, the statistical determination can reflect a likelihood that the deliverer will be able to locate a parking space that is free, at a low cost, and/or at a high cost. Thus, for example, the ECD component 150 can determine a likelihood that the deliverer will be able to park his or her vehicle at a desired location where costs are minimal (e.g., street parking that is free, or available for a minimal duration of time such as a 10-minute interval).

The ECD component 150 can also make a statistical determination as to an amount of time expended by the deliverer to complete an ambulatory portion of a delivery. The determination can, for example, be based on estimating a length of time that a deliverer is likely to be impeded by an impediment or barrier while at a target site. The ECD component 150 can implement, for example, rules, models or other logic to make a statistical determination as to the amount of time that the deliverer will expend as a result of a barrier or impediment of the target site.

Monitoring Deliverer to Determine Delivery Effort and Cost

In some examples, the deliverer can be monitored to determine an actual or expended effort or cost for completing a delivery order at a delivery site. In some examples, the information determined from monitoring the deliverer can be used to confirm or update the E/C-B parameter(s) 165. As an addition or variation, the information determined from monitoring the deliverer can be used to update the respective delivery or supplier site profile stores 155A, 155B. Still further, the information determined from monitoring the deliverer can form the basis for the determination of the E/C-B parameter(s) 165.

According to examples, the monitoring process 162 can monitor the deliverer through, for example, receipt and analysis of service information 109 obtained from the deliverer device 104. As described with some examples, the service information 109 (including location information 113 and/or sensor information 115) can be automatically and repeatedly (i) acquired on the deliverer device 104 by the service application 116, and (ii) transmitted to the system 100 via the deliverer device interface 124. With respect to sensor information 115, the service application 116 can sample movement sensors (e.g., accelerometer and/or gyroscope, altimeter, etc.) and/or environmental sensors (e.g., thermometer, barometer, etc.) to include respective types of sensor information with the service information 109.

In examples, the monitoring component 162 processes the location information 113 and/or sensor information 115 to determine E/C-B parameter(s) 165 that are interpretative of a milestone or metric relating to actual effort or cost of the deliverer in traversing within the delivery site to the delivery location 108. In some examples, the E/C-B parameter(s) 165 can relate to an effort or cost expended by the deliverer during an ambulatory portion of the delivery. As an addition or variation, the E/C-B parameter(s) 165 can relate to an effort or cost expended by the deliverer in terminating a vehicle portion of the delivery (e.g., deliverer stopping a vehicle and/or finding a parking space).

In determining the E/C-B parameter(s) 165, the monitoring component 162 can process the location information 113 and/or the sensor information 115 to identify a length and/or duration of the ambulatory portion of the delivery. Still further, the monitoring component 162 can process the location information 113 and/or the sensor information 115 to determine turns (e.g., left or right) and/or a path of the deliverer during an ambulatory portion of a delivery. In such examples, the monitoring component 162 can generate the E/C-B parameter(s) 165 to reflect various characteristics of the ambulatory portion of the delivery, such as, for example, (i) an overall length and/or duration of the delivery; (ii) segments or events reflecting direction of travel and/or change in direction; (iii) change in elevation by the deliverer; (iv) passage of time (e.g., by threshold number of seconds) while the deliverer location remains relatively unchanged, reflecting the deliverer as waiting; and/or (v) the occurrence of other predefined events over the course of the ambulatory portion of the delivery.

At the delivery site, the monitoring component 162 can determine when the ambulatory portion of the delivery order starts by analyzing the service information 109. In some examples, the monitoring component 162 can determine when the vehicular portion of the delivery terminates and/or the ambulatory initiates based on input from the deliverer. As an addition or variation, the monitoring component 162 can determine when the vehicular portion of the delivery terminates and/or the ambulatory initiates based on the location information 113 and/or the sensor information 115. For example, the monitoring component 162 can analyze the location information 113 and the sensor information 115 to determine when the vehicular portion of the delivery terminates (e.g., vehicle stopped) and/or when the deliverer is walking. As another example, the monitoring component 162 can analyze the location information 113 to determine location coordinates which fit a model or pattern that is indicative of the deliverer having stopped or parked a vehicle. To illustrate, the monitoring component 162 can identify location coordinates that indicate the deliverer is in a lane of traffic where the deliverer's vehicle is slowed, and then made to back into or turn into a portion of the roadway that coincides with a known parking area, driveway or curb space. The monitoring component 162 can further utilize the location information 113 to identify location coordinates that map to a sidewalk or region that is adjacent to the roadway, indicating the deliverer is walking on a sidewalk or shoulder adjacent to the roadway. Still further, the monitoring component 162 can process the location information 113 to determine that the velocity of the deliverer is a walking pace.

In such example, the monitoring component 162 can use the sensor information 115 to weight or confirm the determination(s) made from analyzing the location information 113. In examples, the monitoring component 162 can process the sensor information 115 for movement sensor data, to confirm, or otherwise determine movements of the deliverer and/or vehicle, that are indicative of the deliverer stopping, turning, or moving out of the vehicle, or of other actions that typically occur when the deliverer terminates the vehicle portion and initiates an ambulatory portion of the delivery.

In another variation, the monitoring component 162 can process the sensor information 115 for environmental sensor data, to determine, for example, temperature or barometric variations. Based on environmental sensor data, the monitoring component 162 can confirm or otherwise determine that the environment of the deliverer has changed, such as may occur when the deliverer exits a vehicle.

In another variation, the monitoring component 162 can process input from the deliverer which indicates when the deliverer has terminated the vehicular portion of the delivery. For example, the deliverer may interact with the service application 116 to provide input that identifies the approximate moment when the deliverer parks the vehicle. In some examples, the input from the deliverer can be confirmatory of the determination the monitoring component 162 makes based on the location information 113 and/or the sensor information 115. Alternatively, the determination of the monitoring component 162 can be confirmatory of the input provided by the deliverer.

The monitoring component 162 can further process the location information 113 and/or the sensor information 115 to determine additional E/C-B parameter(s) 165 that relate to the duration or length of the ambulatory portion of the delivery. The monitoring component 162 can identify, for example, the point in which the deliverer reverses direction, indicating the delivery has been completed. As an addition or variation, the monitoring component 162 can identify the point in which the deliverer returns to the vehicle.

In addition to determining the length and/or duration of the ambulatory portion of a delivery, some examples provide for the monitoring component 162 to use sensor information 115 to determine conditions during the ambulatory portion that cause the deliverer to expend additional effort. The monitoring component 162 can, for example, use movement sensor data (e.g., accelerometer data) to determine change in elevation as the deliverer traverses the target site to the requester location. The monitoring component 162 may also use environmental sensor data to detect harsh conditions the (e.g., excessive heat) which make the deliverer's journey more difficult.

As an addition or alternative, the monitoring component 162 can obtain biometric information from the deliverer. For example, the deliverer device 104 can include one or more biosensors to detect information such as the temperature or heartbeat of the deliverer. Alternatively, the monitoring component 162 can operate to obtain biometric information from a biometric device that is worn by the deliverer (e.g., wrist-band). Still further, the system 100 can include separate deliverer interfaces for communicating with additional wearable or biometric devices of the deliverer. The monitoring component 162 can use the biometric data to confirm effort-based actions which the deliverer performs while traversing the target site. Additionally, the monitoring component 162 can use the biometric information to determine a level of exertion that is associated with the actions of the deliverer. For example, the biometric information can indicate whether the deliverer's exertion is moderate or more severe during an ambulatory portion of the delivery. The determination of parameters reflecting, for example, exertion can further be stored as historical data in a respective delivery or supplier profile data store 155A, 155B, for use in determining the E/C-B parameter(s) 165 for other deliverers who may not be equipped with biometric monitoring devices.

The monitoring component 162 can also process the location information 113 and/or the sensor information 115 to determine actions and costs that the deliverer actually expended in terminating the vehicle portion of the delivery. In examples, the monitoring component 162 can process the location information 113 to identify location coordinates which reflect that the deliverer has reached a predetermined region that is within a predetermined range of the delivery location 108, reflecting the deliver's arrival to the target site. To illustrate, the monitoring component 162 can process the location information 113 to determine when the deliverer reaches the city block of an apartment building, where the delivery location of the requester is located. Alternatively, the monitoring component 162 can process the location information 113 to determine when the deliverer reaches a predetermined threshold distance from the delivery location.

As another addition or variation, the monitoring component 162 can process the location information 113 to identify patterns that are indicative of the deliverer attempting to locate parking. For example, the monitoring component 162 can process the location information 113 to determine when the vehicle of the deliverer slows down, as in the far right lane, and/or circles a block of the delivery location. Thus, depending on implementation, the monitoring component 162 can identify actions that the deliverer takes to locate parking, including identifying the length of time the deliverer needed to find parking and/or the number of maneuvers (e.g., lane changes) the deliverer had to perform in order to park the vehicle. The determination that the deliverer may also be looking for parking can also be triggered by the deliverer's operating a vehicle to reach a proximity threshold of the supplier location 131 and/or delivery location 108.

Once the deliverer parks the vehicle, the monitoring component 162 can further monitor the deliverer's traversal to the delivery location. At the delivery site, the parking of the vehicle may terminate the vehicle portion of the delivery and commence the ambulatory portion of the delivery. The monitoring component 162 can track the deliverer using location information 113 transmitted from the 104, in order to determine a distance and/or time interval for the deliverer to walk from the location of the parked vehicle to the delivery location 108, or building of the delivery location 108. Similarly, at the supplier site, the monitoring component 162 can track the deliverer using location information 113 transmitted from the 104, in order to determine a distance and/or time interval for the deliverer to walk from the location of the parked vehicle to the supplier location 131.

According to some examples, the determinations made from monitoring the deliverer can be recorded as historical information with, for example, the respective delivery or supplier site profile store 155A, 155B. In this way, the determinations of the monitoring component 162 can be subsequently used to predict an overall delivery effort and cost for subsequent deliveries, taking into account the determinations of the E/C-B parameter(s) 165 for portions of the overall delivery coinciding with the arrival of the deliverer at the supplier location 131 and the delivery location 108.

In examples, the recorded determinations of the monitoring component 162 at the delivery sites can further identify delivery drop-off locations that avoid impediments or barriers of the delivery site. For example, the monitoring component 162 can identify instances when a deliverer successfully drops off a delivery item at a drop-off location that is within the delivery site, but outside of the delivery location 108, so as to avoid the deliverer having to traverse past a barrier or impediment. For example, in a given building, the monitoring component 162 can record the delivery time for the deliverer to meet the requester at a lobby of the apartment building, as well as the delivery time for other deliveries in the same building where the deliverer signed in with a doorman and/or used an elevator to travel to the delivery location 108. Accordingly, one or multiple delivery drop-off locations can be identified for a given building or target site. In variations, the alternative drop-off locations can further be associated with a value that reflect a time, effort or cost saving. Still further, in examples, monitoring deliverers at the delivery site can further identify the presence of barriers or impediments that may make the delivery to the delivery site or location more difficult, either by effort or time expended. By way of example, the monitoring component 162 can be used to identify barriers and/or impediments that correspond to stairways and stairwells for the building or the delivery site. Alternatively, the monitoring component 162 can be used to identify other features such as exterior entrance doors to buildings (e.g., requiring remote unlock), lobbies that require additional security processes (e.g., check-ins with doorman), elevators and/or interior stairwells. In addition to recording the presence of such barriers and/or impediments, the monitoring component 162 can further record time, difficulty or cost associated with barriers or impediments at specific delivery sites. Thus, for example, the delivery site profile data store(s) 155A can be used to record a wait time of a given deliverer at a particular building.

Still further, in examples, the determinations of the monitoring component 162 can record information that indicates the time, effort and/or cost for deliverers to park their respective vehicles at the supplier and/or delivery sites. The monitoring component 162 can record, for example, the amount of time expended by a deliverer to park his or her vehicle, as well as a distance from the parking space the deliverer was able to find at the supplier location 131 and/or delivery location 108.

In examples, the monitoring component 162 (or other processes) can also record contextual information for deliverers with respect to the deliverers' pick up delivery items from the supplier location 131 and/or dropping-off deliveries at the delivery location 108. In such examples, the recorded contextual information may identify (i) time of day, day of week, and/or month of year, (ii) temperature, precipitation and/or weather reports, (iii) lighting conditions, (iv) traffic conditions, (v) a public event or condition that affects available parking, and/or (vi) other information which may affect or hinder the deliver's ability to park his or her vehicle, or walk to the supplier location 131 or delivery location 108. The contextual information can be determined from a variety of sources, including the deliverer device 104, system data (e.g., time of day), aggregated data (e.g., traffic determined from monitoring one or more deliverers), and/or third-party sources (e.g., weather report). For example, the monitoring component 162 can record determinations of delivery time, cost and/or effort, along with contextual information relating to the respective deliveries, in the respective delivery or supplier site profile data store(s) 155A, 155B.

In some examples, the ECD component 150 can apply contextual information to the E/C-B parameter(s) 165 to better determine the E/C-B parameter(s) 165, reflecting the effort the deliverer actually expends in delivering an order request. For example, the ECD component 150 can anticipate the deliverer expending greater effort or needing longer delivery time when weather is poor. Still further, while some examples provide for the system 100 to utilize monitoring to determine the E/C-B parameter(s) 165, in variations, the ECD component 150 can utilize stored information (as provided with the supplier and delivery site profile data stores 155A, 155B) to determine a predicted or expected value for the effort or cost that the deliverer may incur in connection with a delivery.

The ECD component 150 can correlate the E/C-B parameter(s) 165 to features of a target site (e.g., as provided by the site profile data store(s) 155) in order to make determinations for the service value adjustment 151, reflecting a level of effort or cost that is actually expended by the deliverer in delivering an order request to the delivery location. When expressed as effort, the service value adjustment 151 can be in the form of a scaler or multi-dimensional value, representing, for example, one or more of an intensity of exertion by the deliverer (e.g., amount of work that deliverer performs over a given time frame), an overall amount of effort the deliverer expended (e.g., total distance the deliverer walked to complete the delivery, total duration of delivery, total energy expended by deliverer (e.g., as calories)), a difficulty level of the traversal by the deliverer, and/or a type or classification of the effort expended (e.g., significant physical movement versus waiting or parking). When reflected as cost, the service value adjustment 151 can reflect a price (e.g., currency) or other form of consideration.

In determining the amount of exertion, the ECD component 150 can use the feature information of the target site profile data store(s) 155A, 155B and/or the E/C-B parameter(s) 165 to determine, a priori, specific features at the target site that will cause added effort (e.g., deliverer walking uphill) and/or which can be mitigated. The target site profile data store(s) 155A, 155B may also be used to determine relevant information such as a severity or length of the grade which the deliverer traversed. The SVD component 158 can use the set of E/C-B parameter(s) 165 to determine the service value adjustment 151. In variations in which biometric information is used, the service value adjustment 151 can reflect the actual amount of exertion which the deliverer experienced, based on, for example, the measured heartbeat or other biometric information.

Still further, the ECD component 150 can use feature information of the site profile data store(s) 155 and/or the E/C-B parameter(s) 165 to determine whether the change in elevation by the deliverer was a result of the deliverer taking an elevator or mechanical lift rather than stairs. For example, the target site profile data store(s) 155A, 155B can identify whether a building that encompasses the delivery location has elevators. As an example, if the building has elevators, the SVD component 158 can determine the service value adjustment 151 to weigh in favor of a determination that the deliverer expended effort waiting for an elevator, but not in elevating within the building. To further the example, the ECD component 150 can utilize the E/C-B parameter(s) 165 to either confirm or reevaluate the determination that was made based on the information of the target site profile data store(s) 155A, 155B and/or the E/C-B parameter(s) 165. For example, the ECD component 150 can determine the E/C-B parameter(s) 165 to be indicative of the deliverer taking a path within the building that included the stairwell, rather than the elevator, in which case the SVD component 158 may determine service value adjustment 151 to reflect the deliverer having to expend effort. Moreover, the SVD component 158 can determine the service value adjustment 151 to be of an intensity that reflects the deliverer traversing a number or flight of stairs, as well as additional distance and/or time of travel. The ECD component 150 can determine the E/C-B parameter(s) to a level of granularity that reflects, for example, the amount of exertion the deliverer expended walking to the stairwell from an entrance of the building, and walking from the stairwell to the delivery location. Likewise, in some examples, the SVD component 158 can determine the service value adjustment 151 to reflect the determined level of effort, to a same or similar granularity. By way of comparison, if the deliverer had taken the elevator, the service value adjustment 151 may reflect a greater duration for the ambulatory portion of the delivery (based on wait-time of elevator). The service value adjustment 151 may also reflect a value that reflects the type of effort (e.g., waiting) or specific event (e.g., elevator ride), as determined by the ECD component 150.

As another addition or variation, the monitoring component 162 can detect when the deliverer parks the vehicle, and further determine a distance of the parked vehicle from the delivery location 108. Additionally, the monitoring component 162 can correlate the location of the parked vehicle with the street address, to determine if the parking is metered or charged. The information determined by the monitoring component 162 can also be confirmed by input from the deliverer. For example, the deliverer can take an image of a parking meter or receipt to indicate an actual cost incurred by the deliverer in parking the vehicle. The monitoring component 162 can process the image, and/or information provided with the image, to determine the location and cost of the deliver's parking.

Determination of Service Value Charge

According to examples, the SVD component 158 determines a service value charge 121 for a delivery service request 101, where the service value charge 121 reflects the price or charge of the delivery service for the delivery order. In some examples, the service value charge 121 can include a base value component 149 and a service value adjustment 151, where the service value adjustment 151 correlates to, or is based at least partially on E/C-B parameter(s) 165.

In examples, the base value 149 can be determined in accordance with one or more rules or conditions, such as a static or fixed amount (e.g., all deliveries within a given radius of a supplier location), or based on duration or time of travel calculation for a delivery vehicle to pick up and deliver the items of the delivery service request 101. As an addition or alternative, the base value 149 can include amounts or adjustments that are based on a number of available deliverers, a number of delivery service requests and other factors which can increase or decrease the number of available deliverers. The SVD component 158 can determine the base value 149 based on, for example, the delivery location 108 of the delivery service requests 101.

In examples, the SVD component 158 can determine the service value adjustment 151 based on the estimation of E/C-B parameter(s) 165 by the ECD component 150, using, for example, the delivery and/or supplier site profile data stores 155A, 155B and/or historical delivery information. In variations, the service value adjustment 151 can be determined responsively, while or after a delivery is taking place, based on determinations of effort and/or cost expended by the deliverer. In such examples, the determinations of effort and/or cost expended by the deliverer can be determined from monitoring the deliverer, and/or receiving feedback from the deliverer.

In examples, the service value adjustment 151 can be an expectant or predictive value, determined in advance of the delivery order being made. In variations, the service value adjustment 151 can be determined based on monitoring the deliverer during a given delivery order. In other variations, the SVD component 158 determines the service value adjustment 151 as a target or expectant value, and then monitors the deliverer as to the actual effort or cost expended to confirm or change the service value adjustment 151. Still further, in other variations, the SVD component 158 determines the service value adjustment 151 as a static value that is not subsequently adjusted, but the determination of the service value adjustment 151 is based on a predicted or expected amount of effort and/or cost that will be expended by the deliverer.

As another variation, the SVD component 158 determines the service value adjustment 151 as a set of tiered values, from which a determination is made based on (i) monitoring the deliverer to determine the amount of effort or cost expended, and/or (ii) actions of the requester, with respect to reducing the effort or cost to the deliverer. In the latter example, the ECD component 150 may communicate one or more faciliatory action(s) 153 that the requester can perform with respect to a delivery order. In such examples, the faciliatory actions 153 can be to reduce the effort or cost of the deliverer at the delivery site.

In variations, the service value adjustment 151 can be determined in advance, subject to the requester agreeing, or being informed in advance, of one or more faciliatory action(s) 153 that the requester can perform in connection with receiving their delivery service request 101. In other variations, the service value adjustment 151 can be determined after the delivery, based on monitoring the deliverer to determine whether the requester performed a requested service value reduction action 153. As described with various examples, faciliatory action(s) 153 can correspond to, for example, (i) the requester agreeing to allow for the deliverer to leave a delivery order at a predetermined location (e.g., at an exterior door of an apartment building); or (ii) the requester meeting the deliverer at a given location (e.g., curbside, at an exterior door of a building, etc.).

Determining the Service Value Adjustment for a Delivery Order

The ECD component 150 can determine a set of E/C-B parameter(s) 165, coinciding with various actions that the deliverer may perform once the deliverer is determined to have arrived at the deliverer site. In turn, the SVD component 158 can determine service value adjustment 151 for a delivery order based at least in part on the set of E/C-B parameter(s) 165. The SVD component 158 can further determine the service value charge 121 to include a base value 149 as modified by the service value adjustment 151. By way of example, the ECD component 150 can determine the set of E/C-B parameter(s) 165 to coincide with the arrival of the deliver's vehicle to the delivery site, taking into account the deliverer's efforts to park the vehicle and to walk to the delivery location. Thus, the service value adjustment 151 can be determined independent of a distance or time of travel from a location of the supplier to a delivery site of the requester.

Accordingly, the SVD component 158 can determine the service value adjustment 151 to reflect a level of effort and/or cost that a deliverer is either expected to, or is estimated to have expended, in completing at least a portion of a delivery order. In example, the service value adjustment 151 can reflect the amount of effort and/or cost for the deliverer to complete a delivery order once the deliverer arrives at the delivery site (e.g., starts looking for parking or stops the vehicle). As an addition or variation, the service value adjustment 151 can reflect the amount of effort and/or cost for the deliverer to pick up items of a delivery order from a supplier location 131. Still further, in other variations, the service value adjustment 151 can reflect the amount of effort and/or cost for the deliverer to travel to the supplier location 131 (or supplier locations 131), and to deliver the items of the delivery order to the delivery location 108.

In some examples, the service value adjustment 151 can reflect an effort expended with respect to an ambulatory portion of a delivery, initiated when, for example, the deliverer departs a transportation vehicle (e.g., stops or parks vehicle), such as to pick up the delivery order from the supplier location 131 or to drop-off the delivery order with the requester at the delivery location 108. As another example, the service value adjustment 151 can reflect an amount of exertion on the part of the deliverer. The amount of exertion can correlate to a length of the ambulatory portion of the delivery order pick up at the supplier location 131, and/or the delivery order drop-off at the delivery location 108. Still further, the amount of exertion may be impacted by an elevational grade or terrain impediment (e.g., sandy or gravel walkway) at either of the ambulatory portions. As another addition or variation, the service value adjustment 151 can reflect the expenditure of time by the deliverer while at the delivery site (e.g., time the deliverer is waiting at an exterior door of a building, time for deliverer to wait at elevator, time for deliverer to walk to delivery location, etc.).

As another addition or variation, the service value adjustment 151 can reflect an effort or cost by which the deliverer transitions from vehicle delivery to ambulatory delivery, at either the supplier site during delivery pick up or at the delivery site at drop-off. In such examples, the service value adjustment 151 can further reflect an amount of effort and/or cost for the deliverer to change delivery modes (e.g., drive vehicle to find parking, stop or park vehicle), including factors such as effort and time expended, as well as cost associated with transitioning to ambulatory delivery (e.g., cost for parking a vehicle).

In variations, the service value adjustment 151 can be determined responsively, while or after a delivery is taking place, based on determinations of effort and/or cost expended by the deliverer. In such examples, the determinations of effort and/or cost expended by the deliverer can be determined from monitoring the deliverer, and/or receiving feedback from the deliverer.

Still further, the service value adjustment 151 can also reflect other types of actions which the deliverer may perform in order to complete a delivery order. The service value adjustment 151 can reflect actions which are deemed to add effort or cost (e.g., deliverer turning vehicle off) as compared to actions which may mitigate or minimize the effort or cost to the deliverer (e.g., deliverer meeting requester curbside).

The service value adjustment 151 can also account for contextual information, such as weather and/or time. For example, the ECD component 150 may weigh or otherwise adjust the set of E/C-B parameter(s) 165 to account for weather conditions which can hinder ambulatory delivery (e.g., rain or wind), or otherwise require more cost or expense from the deliverer. As another example, the ECD component 150 may also weigh or otherwise adjust the set of E/C-B parameter(s) 165 to account for darkness. In turn, the SVD component 158 can determine the value of the service value adjustment 151 to reflect the change in the set of E/C-B parameter(s) 165.

Communicating Service Value Adjustment to Requester in Advance

According to examples, the SVD component 158 can make an a priori determination of the service value adjustment 151 based on a site profile of the requester. In examples, the service value adjustment 151 is integrated or otherwise provided with the service value parameters 121 when the interactive menu is rendered on the requester device 102. In such examples, the service value adjustment 151 can be determined as either a fixed value, or an adjustable value. In the latter case, the service value charge 121 can be displayed as, for example, a delivery cost that has an upper and lower range (e.g., $3.00-$5.00). As a target or expectant value, the SVD component 158 can determine the service value adjustment 151 based on a delivery location 108 that is determined or identified from the requester information 103 and/or the requester's order request. For example, the delivery location 108 can correspond to a location associated with the requester, determined from the current location 107, or determined from input provided by the requester via the requester device 102. The ECD component 150 can estimate or otherwise predict values for the set of E/C-B parameter(s) 165 based on stored profile information about a delivery site of the delivery location 108, which can include features of the delivery site, as well as historical information of past deliveries. Based on the known features of the delivery site and/or the historical information, the SVD component 158 can determine a service value adjustment 151.

In some examples, the service value adjustment 151 can be integrated or otherwise provided with the service value charge 121, to reflect the level of effort that is potentially or actually required from the deliverer in completing the delivery service request 101 at the site of the requester. For example, the service value adjustment 151 can reflect a service value charge for the delivery service request 101 that is in the form of a range between a high and low value, where the high and low values correlate to the amount of effort that the deliverer actually makes when completing a delivery service request 101. In variations, the service value adjustment 151 can be provided as a separate amount from the service charge or order value. In variations, the service value adjustment 151 can form a transparent component of a service value charge that is provided to the requester in connection with a delivery service request 101. In variations, the service value adjustment 151 can be communicated as a range, or set of tiered values, with indications of faciliatory action(s) 153 that the requester can perform in order to minimize or otherwise lower the service value adjustment 151 and the service value charge 121 for the delivery service.

In variations in which the service value adjustment 151 is indicated to the requester in advance of the delivery, some examples provide for the system 100 to communicate information that guides the requester in reducing or otherwise mitigating the service value adjustment 151. As described with other examples, the ECD component 150 can, for example, identify, or otherwise indicate, one or more faciliatory actions 153 to the requester device. For a given delivery service request 101, the faciliatory action(s) 153 can identify (i) one or more alternative locations that are associated with a target site identifier; and (ii) one or more one or more conditions with respect to each of the identified alternative locations. The one or more conditions can include, for example, (i) the requester agreeing to permit the deliverer to drop-off the delivery service request 101 at the alternative location (e.g., by exterior door); (ii) the requester meeting the deliverer at an identified location; and/or (iii) the requester performing an identified action (e.g., electronically unlocking an exterior door to building, opening door, etc.) with a designated duration of time (e.g., 15 seconds). In this way, the faciliatory action(s) 153 can identify one or multiple alternative candidate delivery locations associated with the target site identifier, corresponding to locations which the requester can elect to receive a delivery order, in place of a default or preselected location (e.g., address of requester's residence). The faciliatory action(s) 153 can indicate that the alternative delivery location within the site can be selected by the requester to avoid a higher service value adjustment, as indicated by the service value adjustment 151. To illustrate, a requester may reside in an apartment building that has an external building door. In such an example, the service value adjustment 151 can reflect a determination that a deliverer will need to perform one or more of the following actions in order to complete the requester's delivery order: (i) the deliverer will have to wait at an external door of the requester's building before the requester allows the deliverer to enter the building (e.g., requester opens external door to building, or uses electronic lock to permit access to building); (ii) the deliverer will be asked to sign in with a doorman or security guard before being allowed to travel further within the site to the delivery location 108; (iii) the deliverer will have to navigate within a building using an elevator or stairwell, to reach the location of the requester (e.g., requester's apartment or place of work); and/or (iv) the deliverer may need to wait just beyond the location of the requester (e.g., requester's residence door, lobby to requester's place of work). In turn, the faciliatory action(s) 153 can identify a meeting location for the requester to meet the deliverer, where the meeting location corresponds to the external door to the site, the location of the doorman, a lobby, a ground floor elevator, or outside of the location of the requester (e.g., outside of requester's front door). In variations, the faciliatory action(s) 153 can identify an alternative delivery location for the requester, in order for the requester to avoid receiving a higher service value adjustment 151 for their delivery order.

Predicting Delivery Time, Difficulty and/or Cost

In examples, the planning component 160 can generate and communicate one or more arrival plans 175 to a given deliverer in connection with the deliverer performing a task of the delivery request (e.g., picking up a delivery item from a supplier, dropping-off a delivery order at a delivery location 108). The planning component 160 may generate arrival plans 175 based on, for example, known information about features of the delivery or supplier sites (e.g., as provided by respective delivery and supplier site profile data stores 155A, 155B), as well as historical information recorded from other deliverers who performed tasks at the same supplier or delivery site. Still further, the planning component 160 may select previously used arrival plans 175 for upcoming or in-progress deliveries that target a same supplier or delivery site.

As described by various examples, the arrival plans 175 can integrate instruction to the user for traversing a delivery or supplier site (e.g., through ambulatory travel, etc.). The arrival plans 175 can also specify actions that the deliverer can perform to complete the pick up or delivery of items for a given delivery request. As described with various examples, the actions can include actions the deliverer can perform to facilitate target site navigation, avoid or minimize barriers or impediments to the target, and/or complete a particular task to meet a given objective.

The planning component 160 can generate one or more arrival plan 175 as a response to a delivery service request 101. According to some examples, the planning component 160 can generate arrival plans 175 for individual delivery orders using information from delivery and/or supplier site profile data stores 155A, 155B. In variations, the planning component 160 may generate separate arrival plans 175 for planning the arrival of the deliverer at the deliverer site and/or supplier site. Thus, for a given delivery order, a deliverer may receive a first arrival plan 175 to facilitate the deliverer's arrival at the location of the supplier, as well as a second delivery plan 175 to facilitate the arrival of the deliverer at the delivery site. In cases when there are, for example, multiple suppliers for a given delivery, separate arrival plans 175 can be generated and communicated to the deliverer at each supplier site. Still further, separate arrival plans 175 can be communicated as, for example, distinct communications (e.g., in-application messages that are alerted to the user) to the deliverer, for use at each of the supplier and delivery sites. Still further, in other alternatives, instructions for implementing arrival plans 175 at the supplier and/or delivery sites can be communicated at one time, such as on a panel or interface of the deliverer's device.

Still further, in other variations, the arrival plans 175 can be combined or otherwise integrated with a navigation plan 176, where the navigation plan 176 provides step-by-step navigation guidance to the deliverer, from point of departure, to arrival at supplier and delivery sites. In such examples, a navigation plan 176 can integrate directions for use by the deliverer when operating a vehicle, combined with arrival plans that specify, for example, ambulatory navigation, parking instructions, supplier arrival instructions, building traversal instructions, and/or instructions for dropping off the delivery order at or near the delivery location. Still further, the navigation plan 176 can be integrated to accommodate transport preferences of the delivery.

According to an aspect, the planning component 160 can generate a navigation plan 176 that accommodates one or multiple modes of transport on the part of the deliverer. In one implementation, the navigation plan 176 sequences alternative modes of transports, in enabling the deliverer to travel to the supplier location 131, then to the delivery location 108. In such examples, the sequenced modes of transport can reflect, for example, public transport (e.g., bus, train), bicycle transport and/or vehicular transport. In variations, the planning component 160 can generate the navigation plan 176 to enable the deliverer to select from multiple possible transport modes and transport sequences, for one or multiple segments of the delivery.

In examples, the planning component 160 can generate individual arrival and/or navigation plans 175, 176 to meet a particular objective with respect to corresponding delivery orders. Depending on implementation, the objective of the arrival and/or navigation plans 175, 176 can be to, for example, minimize a delivery time for a given delivery order, minimize a cost of a delivery order, and/or minimize an effort expended by the deliverer to make a delivery.

In variations, the objective of the arrival and/or navigation plans 175, 176 can be specified by a preference of the deliverer. For example, the deliverer may specify a preference for safety when making deliveries. Alternatively, the preference of the deliverer may be to specify safety for delivery orders that meet a particular condition, such as time of day (e.g., evening), or as to particular sub-region (e.g., deliverer is willing to park further away from the delivery location 108 when parking in preferred neighborhoods).

To meet the objective, the arrival plan 175 can, for example, specify parking instructions as to where a deliverer should look for parking when arriving at either of the supplier or delivery site. The arrival plans 175 can alternatively specify ambulatory navigation by, for example, displaying and/or instructing the deliverer to walk along a particular path to reach the supplier or delivery location. For the deliverer's arrival at the supplier location 131, the arrival plan 175 can specify, for example, instructions as to what entrance to the supplier (e.g., restaurant) the deliverer should use, instructions as to how the deliverer should check to determine if the particular delivery order is ready, and/or instructions as to where the deliverer should wait for the delivery order to be completed. Likewise, for the deliver's arrival at the delivery location 106, the planning component 160 can generate the arrival plan 175 specify building traversal instructions, which may specify an action or series of actions the deliverer should perform to reach the delivery location to meet a particular objective (e.g., least amount of exertion or time expended, least amount of costs incurred, least use of unlighted paths, etc.). To further illustrate, the arrival plan for the delivery site can specify which entrance to an apartment or business building a deliverer should use, which elevator the deliverer should use, and/or how the deliverer should navigate through a building check-in point.

According to examples, the planning component 160 can configure the arrival plan 175 for a delivery order to conform to the prioritized objective(s) of the deliverer (e.g., reduce effort or maximize safety). By way of example, the selection of which parking lot the deliverer should use, or the path the deliverer should take to the delivery location, can be affected by the objective of the arrival plan 175. For example, to implement an objective that prioritizes cost reduction, the arrival plan 175 may specify for the deliverer to park in a free parking lot that is not the closest parking lot to the supplier or delivery location. On the other hand, to prioritize an objective of safety, the arrival plan 175 may specify that the deliverer should park the closest parking lot to the supplier and/or delivery location, even though the closest parking lot may incur a charge.

In examples, the planning component 160 can generate the arrival plans 175 based in part on predictions that the planning component 160 makes with respect to, for example, where parking may be located at the respective supplier and/or delivery site. In making the predictions, the planning component 160 may use information obtained from the respective delivery and/or supplier site profile data stores 155A, 155B. As an addition or variation, the planning component 160 may use contextual information (e.g., time of day, day of week, month, weather, events, etc.) that is relevant to the particular delivery order.

Requester Faciliatory Actions for Mitigating Effort and/or Cost Expended

In variations, the planning component 160 can also identify a faciliatory action 153 that the requester can perform to facilitate the deliverer. The faciliatory action 153 can include an action that a requester can perform to reduce the effort or cost that would otherwise be expended in delivering the delivery order to the delivery location 108. To illustrate, the deliverer can be asked to meet the deliverer at a particular location within the target site (e.g., at or near an exterior door of a building, or at a building lobby), or the requester may specify that the deliverer can drop-off the delivery order at a particular location (e.g., outside the door of the delivery location 108).

In some examples, the requester can provide customized instructions to facilitate a delivery. For example, the service application 106 can include, or be provided with logic to enable the requester to upload a picture that identifies a specific location where the deliverer can drop-off the delivery order. Still further, system 100 can include a delivery logic with service applications 106, 116 of the respective requester and deliver devices, to enable the requester and deliver to communicate directly on the occurrence of a triggering condition (e.g., deliverer reaches target site, deliverer initiates a communication session with the requester, etc.).

In such examples, the planning component 160 can also receive input from the requester that identifies the requester's willingness to perform a particular faciliatory action 153. The planning component 160 can further identify the faciliatory action 153 that is due on the part of the requester to the deliverer, using, for example, the arrival plan 175.

In some examples, the requester can specify a faciliatory action 153 that corresponds to a willingness on the part of the requester to communicate directly with the deliverer at a particular point during the delivery. For example, the requester can communicate input (e.g., via the service application 106, running on the requester device 104) that identifies a faciliatory action 153 that the requester intends to perform. Alternatively, the requester's preference for performing a particular faciliatory action 153 can be saved as part of the requester's profile. In examples, the faciliatory action 153 can also be a designation by the requester that the deliverer is to communicate directly with the requester, either on arrival at the destination site, or in response to a particular condition or event (e.g., external door is locked).

Still further, the planning component 160 can generate the arrival plans 175 to specify a triggering condition that specify when a given communication session is to take place. For example, the planning component 160 can provide instructions that specify that the deliverer is to initiate a communication session with the requester upon the deliverer's arrival to the exterior door or lobby of the requester's building.

The planning component 160 can monitor the deliverer's location or progress during the delivery, so as to timely notify the deliverer of a particular action that the deliverer is to perform while at the delivery site (e.g., initiate communication with the requester)

In examples, the arrival plans 175 can be generated as a cohesive set of user-instructions, identifying one or more actions that the deliverer is to perform in connection with completing a delivery task (e.g., pick up delivery request at supplier location 131, drop-off items at the delivery location 108). The deliverer device interface 124 and/or the service application 116 operating on the deliverer device 104 can optimize the deliverer's device to process the corresponding arrival plan 175. In particular, the planning component 160 can communicate, through the deliverer device interface 124, context and site-specific instructions that the deliverer can readily view and digest while the deliverer is walking and carrying a delivery order (e.g., using one hand).

In some examples, the arrival plans 175 can include a set or sequence of instructions that are rendered to the user and then made dynamic, to distinguish an instruction or milestone that the deliverer has to perform from an instruction or milestone that the deliverer has yet to perform, or has already performed. For example, the service application 116 can execute logic to scroll the content of an arrival plan 175 (e.g., up or down), so the most relevant portion of an arrival plan (e.g., based on the deliverer location or activity) is displayed more prominently (e.g., highlighted, enlarged) or exclusively on the deliverer device 104.

In other variations, the arrival plans 175 can communicate the set of instructions to the deliverer in piecemeal fashion, by for example, monitoring the location of the deliverer once the deliverer arrives at the target site. To illustrate, the arrival plans 175 can signal or otherwise communicate a first message or instruction to the deliverer once the deliverer parks his or her vehicle, where the first message provides the deliverer with information as to how the deliverer should proceed to the delivery location 108 (e.g., "walk from your vehicle to the West entrance of the building at the corner"). The planning component 160 and/or service application 116 can further monitor the location of the deliverer to identify when the deliverer reaches a predetermined location, before communicating a next message or instruction (e.g., "proceed to the lobby") and then a next message or instruction (e.g., "check-in with doorman"). The arrival plans 175 can also specify actions the deliverer may be requested to perform in order to communicate his or her status during the delivery. By way of example, the communication of the deliverer's status can trigger the deliverer device interface 124 to generate an acknowledgement for the planning component 160, reflecting that the deliverer reached or completed a milestone of the delivery request (e.g., deliverer receives message to "check-in with doorman, then tap screen" and then taps the screen once deliverer completes the communicated task). In other variations, the instructions can also be timely communicated to the deliverer through audio output from the deliverer's respective device.

In examples, ECD component 150 can determine the service value adjustment 151 based at least in part on predictive determinations 161 relating to effort and/or cost. In variations, the ECD component 150 can determine the service value adjustment 151 as a range, based at least in part on the predictive determinations 161.

In other examples, the service value adjustment 151 can be communicated to the requester (via the requester device interface 110 and the service application 106) in advance, to notify the requester of additional cost (or potential cost) of the delivery. The ECD component 150 can further identify one or more reasons, such as provided by or related to the predictive determinations 161, for additional effort or cost to be expended for the delivery. In turn, the ECD component 150 can associate the predictive determinations 161, and/or the reasons related to the respective predictive determinations 161, to one or more faciliatory actions 153 on the part of the customer.

In examples, the ECD component 150 can communicate the service value adjustment 151 as a potential additional cost for a given delivery service request 101, where the service value adjustment 151 is based on predictive determinations 161 for E/C-B parameter(s) 165. In such examples, the requester can be provided an opportunity to perform an additional faciliatory action 153 to reduce an overall delivery charge that is at least partially attributable to the predictive determination(s) 161 of E/C-B parameter(s) 165. Thus, the service value adjustment 151 can be reduced, or partially reduced, to account for a mitigating action that the requester can perform, where the mitigating action of the requester reduces the effort and/or cost of the delivery to the deliverer.

In variations, the planning component 160 can also include rules, models or other logic to associate a predictive determination 161 with for E/C-B parameter(s) 165 with one or more faciliatory actions 153 that mitigate against an expended effort or cost. The planning component 160 can communicate the one or more faciliatory actions 153 to the mobile device 102 of the requester, to further a desired delivery objective (e.g., reduce delivery time and or avoid parking cost). As an example, the planning component 160 can associate predictive determinations 161 relating to unavailability or expense of parking spaces (e.g., parking space may be far from the delivery location 108, parking space may take a long time to locate) to a faciliatory action 153 that can be performed by the requester, such as the requester meeting the deliverer curbside in front of the requester's building.

As another example, the planning component 160 can associate predictive determinations 161 relating to barriers or impediments of the requester's building (e.g., security desk and/or elevator) to meeting locations within the building where the deliverer can avoid the barrier or impediment. In such examples, the meeting location can correspond to the exterior door of the requester's building, where the requester can wait inside the door until the deliverer arrives at the building.

Still further, the planning component 160 can identify a faciliatory action 153 that corresponds to the requester identifying, or otherwise agreeing to use, an alternative drop-off location to the delivery location 108. By way of example, the alternative drop-off location can correspond to (i) a location at the requester's residence, just outside of the front door, (ii) a location within an interior location (e.g., garage) of a residence that is left accessible to the deliverer, or (iii) a location near or outside of the exterior door to the requester's building. To enable greater specificity and avoid miscommunication, the requester can be provided an interface that enables the requester to capture and upload an image, set of images or video of the desired drop-off location, so that the drop-off location can be visually communicated and understood.

In some examples, the service application 106 can include a user-interface tool 106A that includes an image capture and editing tool. The requester can use the user-interface tool 106A to capture an image of the desired drop-off location, using, for example, markers or highlights that specify where the deliverer should place the delivery before leaving. The user-interface tool 106A can also enable the requester to specify a set of instructions for the deliverer, as part of, for example, the deliverer's arrival plan. For example, the requester can specify a set of actions (e.g., drop-off delivery order in bushes of picture, then ring doorbell"), or conditional actions ("please use drop-off location in picture if no one answers doorbell"). In response to the user's performance of the faciliatory action 153, or agreement to perform the faciliatory action 153, the ECD component 150 can reduce the 121 by eliminating or reducing the service value adjustment 151.

In examples, the planning component 160 can operate with the monitoring component 162 to trigger one or more predetermined actions that are associated with completion of the deliverer's task (e.g., pick up delivery item at supplier location 131, drop-off delivery order at delivery location 108) and/or the delivery order. The actions can include those which are performed by the system 100 (e.g., send notification to requester or deliverer), the deliverer (e.g., park vehicle, find elevator, walk to site, etc.) and/or the requester (e.g., faciliatory action) of the requester. The planning component 160 can receive monitoring information from the monitoring component 162 as to, for example, the real-time (or near real-time) location of the deliverer. Additionally, one or more site-specific triggers can be associated with a given delivery service request 101, based on, for example, known profile information for a given target site (e.g., such as stored with delivery or supplier site profile data stores 155A, 155B). The site-specific triggers can correlate to an event condition (e.g., deliverer parks vehicle) or location condition (e.g., deliverer reaches threshold distance from delivery location 108). The planning component 160 can, for example, use input from the monitoring component 162 to identify when a condition associated with one of the site triggers is met by the deliverer. The planning component 160 can respond to the occurrence of the condition for a site or delivery request trigger by performing a predetermined action, and/or monitoring for performance of an identified action by the deliverer (e.g., park vehicle, find elevator, walk to site, etc.) and/or the requester (e.g., faciliatory action.

Additionally, in examples, the planning component 160 can communicate a status or state of one or more pending or open actions for a given delivery task to the deliverer through the deliverer device interface 124. As shown with, for example, examples of FIG. 3A through FIG. 3D, the status or state of pending or open actions for a given delivery service request can be rendered on an interface generated by the service application 116 on the deliverer device 300. The deliverer can thus view the status of one or more actions (e.g., readiness to perform (or performance of) the faciliatory action on the part of the requester), and the status can be updated with progress of the deliverer in, for example, reaching the delivery location 108 and/or supplier location 131.

Still further, in examples, the ECD component 150 can generate the E/C-B parameter(s) 165 to be predictive of a parking charge that the deliverer will likely incur in completing a delivery. The ECD component 150 can, for example, use delivery site profile information 159A for the delivery site to determine the likelihood that a parking charge will either be needed, or will enable the deliverer to reduce effort or meet another objective when completing the delivery. In such examples, the delivery site profile information 159A can identify, for example, site-specific parking features (e.g., location of parking lots, whether parking lots charge for parking at time of delivery), as well as historical information obtained from prior deliveries, such as feedback from deliverers completing past deliveries to the delivery site identifying the location of a parking spot and the charge incurred for the parking spot.

In some examples, the ECD component 150 can communicate a predictive determination 161 that a delivery will incur a parking charge to the SVD component 158, which in turn can adjust the service value adjustment 151 for the delivery order, so that the parking charge is passed to the requester. The predictive determination 161 can also be communicated (e.g., by the E/C-B parameter(s) 165) to the planning component 160, which can then integrate a suitable payment token into an arrival plan 175 for the deliverer, in connection with completing the particular delivery service request 101. In such examples, the service value adjustment 151 can be conditional, meaning the requester would only be charged if the parking token is used by the deliverer.

Still further, in variations, the system 100 can identify, or indicate one or more faciliatory actions 153 which the requester may perform (e.g., "requester has indicated that she will meet you at the lobby", or "the lobby has been identified as a possible meeting place, please keep a lookout for the requester."). In examples, the deliverer can provide feedback to the ECD component 150, via the deliverer device interface 124, as to whether the requester performed the identified faciliatory action 153. For example, the deliverer device interface 124 and/or the service application 116 can prompt the deliverer to provide feedback once the delivery is complete.

According to examples, the delivery and/or supplier site profile stores 155A, 155B and/or planning component 160 can also be utilized by other components of system 100, to implement operations to configure the delivery process to better meet an objective (e.g., reduce effort by deliverer, complete delivery). In examples, the matching component 140 can use the respective delivery or supplier site profile stores 155A, 155B, and/or the determinations of the planning component 160, to select a delivery type. For example, the matching component 140 can obtain information about the features of a target site (e.g., very steep hill), to select a vehicle rather than a bicycle, for mode of transport or type of delivery to the target site. The matching component 140 can further incorporate information about the delivery service request 101, as provided by the order interface 120, to select the mode of transport or type of transport to the target site. For example, if the delivery order is large, the matching component 140 can weigh against bicycle delivery. If the delivery order is small, on the other hand, the matching component 140 can weigh in favor of selecting a bicycle delivery, particularly if the determination of the planning component 160 is that parking may be expensive or difficult (e.g., sparse, far from the delivery location 108, etc.).

Methodology

Figure 2A:
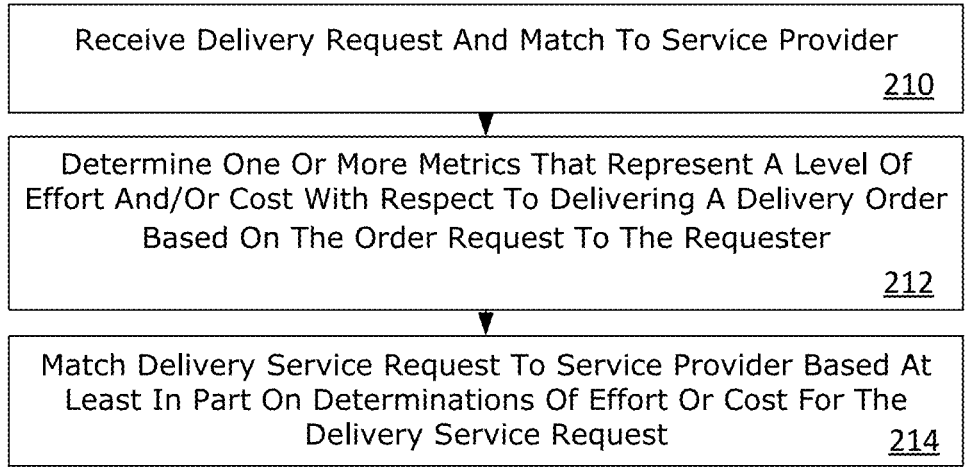
FIG. 2A illustrates an example method for using effort-based determinations to arrange transport for delivery service requests.
Figure 2B:
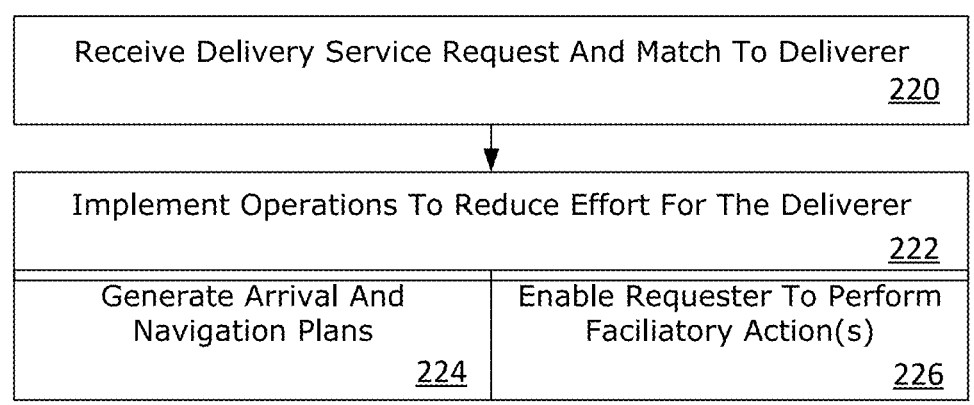
FIG. 2B illustrates an example method for facilitating a deliverer in mitigating site-specific features that may otherwise cause the deliverer to expend effort.
Figure 2C:
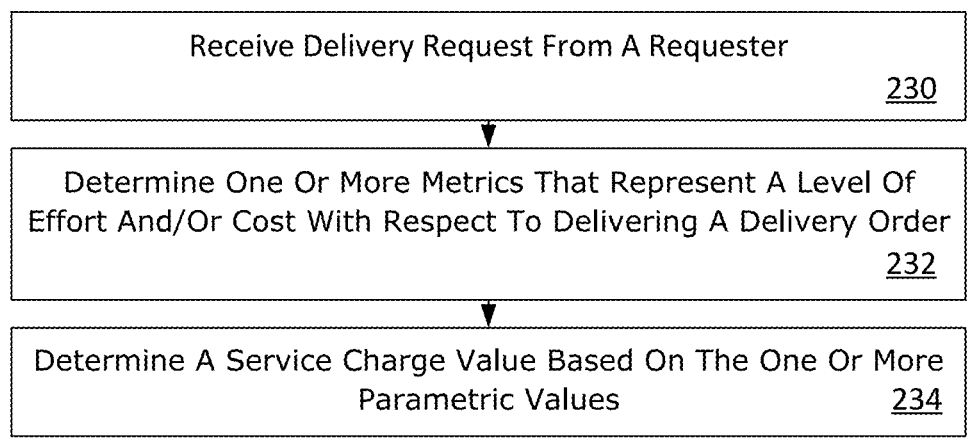
FIG. 2C illustrates an example method for determining a service charge for a delivery service charge to account for an amount of effort or cost expended by the deliverer.

FIG. 2A illustrates an example method for using effort-based determinations to arrange transport for delivery service requests. FIG. 2B illustrates an example method for facilitating a deliverer in mitigating site-specific features that may otherwise cause the deliverer to expend effort. FIG. 2C illustrates an example method for determining a service charge for a delivery service charge to account for an amount of effort or cost expended by the deliverer. In describing examples of FIGS. 2A, 2B and 2C, reference may be made to elements of FIG. 1 for purpose of illustrating suitable components for performing a step or sub-step being described.

With reference to an example of FIG. 2A, a delivery service request may be received for a given requester (210). As described with other examples, a requester can interact with a service application 106 to submit a delivery service request 101 (e.g., food order request from a nearby restaurant).

The system 100 can determine metrics reflecting an amount of effort or cost that is predicted, or otherwise expected to be expended by a selected deliverer in connection with a delivery request (212). In some examples, the metrics of effort or cost can be expressed as a set of E/C-B parameter(s) 165 that reflect a determination of effort (e.g., duration, exertion, difficulty, etc.) and/or cost (e.g., charge for parking, wait time, etc.). The ECD component 150 can determine values for the set of E/C-B parameter(s) 165, in regards to the deliverer traversing the delivery site (e.g., parking vehicle and/or traversing a building of the delivery location 108) based on known information about the delivery site, such as expected features of the delivery site and/or historical values for one or more of the set of E/C-B parameter(s) 165, in connection with prior deliveries to the same delivery site.

In similar fashion, the ECD component 150 can determine values for the set of E/C-B parameter(s) 165 in connection with the deliverer traversing a site of the supplier. At the supplier site, the set of E/C-B parameter(s) 165 can reflect, for example, an estimated or expected ambulatory requirement on the part of the deliverer, where the ambulatory requirement may also account for features such as the availability of parking and other features of the supplier site (e.g., shopping mall). Still further, the E/C-B parameter(s) 165 can reflect effort or cost for alternative types of transport modes which the deliverer may deploy.

In examples, the delivery service request is matched to a deliverer based at least in part on determinations of effort or cost associated with the delivery service request (214). In some examples, the determination of E/C-B parameter(s) 165 can favor or disfavor some deliverers from selection. For example, if the particular service delivery request 101 is deemed to require a significant amount of exertion (e.g., deliverer likely have to walk up steep hill), the matching component 140 can select only those deliverers who can physically handle the added level of exertion. For example, the matching component 140 can use the deliverer data store 134 and/or deliverer account store 173 to identify those deliverers who have ability or preference settings that allow for them to handle the amount of exertion which may be required.

As another variation, the matching component 140 can use the E/C-B parameter(s) 165 to determine, or favor selection of a particular type of transport. For example, if the delivery location 108 is on a steep hill, the matching component 140 can use the respective determination of the E/C-B parameter(s) 165 to select deliverers who use vehicles, rather than, for example, bicycles. As another example, The ECD component 150 may determine, from features or delivery site information 159A of the delivery site, that available parking is difficult, costly or likely unavailable for a given threshold perimeter surrounding the delivery location 108. In turn, the matching component 140 can weigh or select against a deliverer who operates a vehicle, in favor of a deliverer who operates a bicycle, in order to avoid the effort and/or cost for parking to the selected deliverer. In this way, the determinations of effort or cost can filter, weight or otherwise influence the match process for selecting the deliverer.

With reference to an example of FIG. 2B, the system 100 can receive a delivery service request 101 and match the delivery service request 101 to a deliverer (220). In examples, the system 100 can further respond to matching the delivery service request by implementing one or more operations that facilitate the deliverer in reducing or minimizing a level of effort or cost that may have otherwise been needed from the deliverer (222). In some examples, the system 100 can generate one or more of a delivery site arrival plan, a supplier site arrival plan and/or a navigation plan (224). As described with some examples, the determination and communication of arrival and navigation plans 175, 176 can reduce effort on the part of the deliverer by, for example, identifying actions which the deliverer can perform, including specific ways in which the deliverer can perform the actions, in order to avoid or mitigate one or more target site features that are likely to be a source of effort expenditure by the deliverer. As an addition or alternative, the system 100 can enable the requester to perform select faciliatory actions to facilitate the deliverer in completing the delivery (226).

With reference to an example of FIG. 2C, the system 100 can receive an order request from a requester, where the order request specifies, for example, a food preparation source (e.g., supplier location 131) and one or more food items that are to be prepared at the food preparation source (230).

In connection with the request, the system 100 determines one or more metrics that represent a level of effort with respect to a delivery order for the delivery service request (232). In examples, the one or more metrics are independent of a distance or time of travel from a location of the food preparation source to a delivery site of the requester. For example, the metrics can reflect an amount of effort expended by the deliverer in parking a vehicle, walking from the vehicle to a building of the requester, and/or traversing through the building (including traversing stairs or using elevators, etc.).

In examples, the system 100 can determine a service charge value based at least in part on the one or more parametric values (234). In this way, the service charge value can reflect, for example, additional value to the deliverer in connection with the deliverer expending an unusual amount of effort to complete the delivery.

Example Interfaces

FIG. 3A through FIG. 3L illustrate example interfaces for use by users of an on-demand delivery system. Accordingly, example interfaces such as shown with examples of FIG. 3A through FIG. 3L may be implemented by, for example, a network computing system such as described with an example of FIG. 1. In describing examples provided below, reference made to elements of FIG. 1 is provided to illustrate a component or element for implementing functionality as described by an example of FIG. 3A through FIG. 3L.

Figures 3A, 3B:
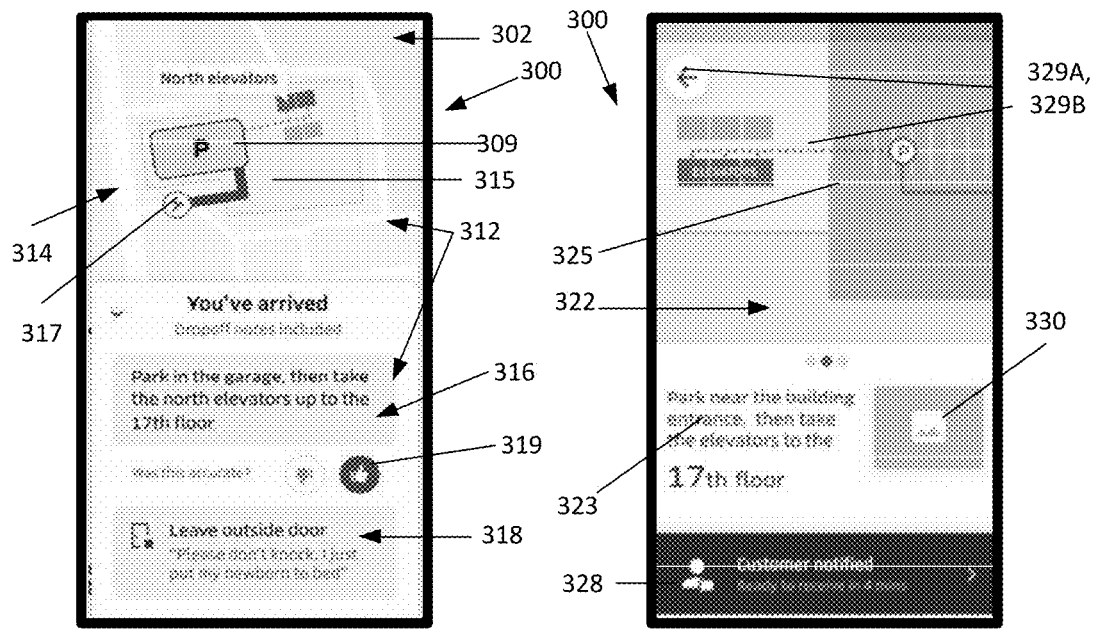

FIG. 3A illustrates an example interface 302 for rendering an arrival plan 312 on a deliverer device 300. The interface 302 can be implemented by, for example, a service application 116 running on the deliverer device 104. According to examples, the arrival plan 312 can include one or multiple portions.

In an example of FIG. 3A, a first portion 314 of the arrival plan 312 can provide visual guidance to facilitate the deliverer in parking his or her vehicle, and further in walking from the parked vehicle to a building or location of the delivery location 108. For example, the arrival plan 312 can display map content 315, showing, for example, an indicator 317 of the vehicle operated by the deliverer. The arrival plan 312 can also be dynamic—for example, the indicator 317 can move on the interface 302 to reflect an approximate current position of the deliverer concerning, for example, a landmark indicator 309 (e.g., parking garage).

As further illustrated by an example of FIG. 3A, the arrival plan 312 can also provide instructions for the deliverer to guide the deliverer from the parking place of his vehicle towards an entrance of a building where the delivery location 108 is located. The guidance provided to the deliverer via the interface 302 can specify, for example, a path (e.g., dotted lines), elevators and other features that the deliverer can use to traverse the parking lot or delivery site. The path and/or features of the arrival plan 312 can further guide the deliverer in a manner that promotes an objective of minimizing an effort or cost on the part of the deliverer in completing the delivery. In some variations, the arrival plan 312 can be implemented with a trigger, so that the first portion 314 and map content can be rendered in response to, for example, a location of the requester and/or a contextual trigger.

In an example of FIG. 3A, additional portions 316, 318 of the arrival plan 312 can be rendered concurrently with the map content 315 of the first portion 314. The additional portions 316, 318 can include messages or other content that is specific to the delivery or delivery task that the deliverer is performing. The portion 316 can, for example, include text content to supplement the map content 315.

In a variation, the portion 318 can be used to render a message from the requester. In some examples, the message for the arrival plan 312 can include content that identifies, for example, a faciliatory action that the requester has indicated will be performed. In a variation, the portion 318 can render a delivery instruction or request of the requester to the deliverer, in advance of the deliverer arriving at the delivery location 108.

In examples, the interface 302 can also solicit feedback from the deliverer with respect to the accuracy of the content provided with the arrival plan 312. For example, a feedback feature 319 can be integrated with the arrival plan 312, which the user can interact with to confirm the accuracy of, for example, the map content 315 or instructions. In an example shown, the feedback feature 319 is binary, such that the deliverer can minimize the time required to provide feedback that confirms accuracy. As an addition or variation, a feedback interface can be provided for the deliverer to provide more specific input as to the accuracy of the arrival plan 312. For example, if the user fails to confirm accuracy through interaction with the feature 319, the interface 302 can provide an alternative interface where the user is requested to provide more specific input as to where the arrival plan 312 failed to be accurate. In this way, the system 100 can process input from deliverers to improve arrival plans for subsequent deliverer's who have delivery orders for the same site or location. For example, over time, the arrival plan 312 for a particular destination or site can become highly specific, with variations to the arrival plan 312 being made to accommodate contextual parameters (e.g., time of day, weather, etc.) or preference of the deliverer.

FIG. 3B illustrates a variation to an interface of a deliverer device on which an arrival plan is rendered. In an example of FIG. 3B, an arrival plan 322 can display multiple portions 322, including a map portion 325 and a text portion 323 to instruct the deliverer concerning direction, distance or other factors. In an example, the arrival plan 322 can further display, for example, a next step instruction that the deliverer can initiate or otherwise follow as the deliverer progresses through the delivery site.

In an example of FIG. 3B, the arrival plan 322 can further be used to display information about a faciliatory action that the requester can perform. As an addition or variation, the portion of the arrival plan 322 can display information about the faciliatory action that the customer is to perform.

FIG. 3B illustrates another example in which an interface for a deliverer device renders an arrival plan to a deliverer. In an example of FIG. 3B, an arrival plan 322 can be generated for the deliverer device 300, where the arrival plan 322 includes multiple portions, such as a map portion 325 and a text portion 323. In an example, the text portion can display instructions to instruct the deliverer concerning direction, distance and/or other site features. Further, the map content 325 can display one or more directional indicators 329A, 329B for the ambulatory travel of the deliverer, given the specific parking space and garage used by the deliverer. The arrival plan 322 can also display, for example, an instruction or guidance as to where the deliverer should look for parking (e.g., "near the building entrance"). The arrival plan 322 can also display a next step instruction 326 that the deliverer can initiate or otherwise perform (e.g., "take the elevators to the 17th floor") as the deliverer progresses through the delivery site.

In an example of FIG. 3B, the arrival plan 322 can further be used to display information about a faciliatory action that the requester may perform. In other variations, the arrival plan 322 can also display a message or indicator 328 for the requester's commitment or willingness to perform a specific faciliatory action. The indicator 328 can, for example, identify readiness on the part of the requester, as well as other information such as an alternative meeting place (e.g., at elevators on the 17th floor) where the requester is to receive the delivery. The readiness of the requester (e.g., to remotely unlock an exterior door) or alternative meeting place for receiving the delivery request can thus serve as alternative examples of the faciliatory action that the requester can perform. The specific actions or options the requester can elect to perform as a faciliatory action to, for example, reduce the service charge for a delivery can vary from site to site, based on identified features of individual sites (e.g., location of parking garages, presence of elevators, etc.).

As indicated by indicator 328, the system 100 can trigger or otherwise notify the requester as to when the requester should perform the faciliatory action. The arrival plan 322 can display, for the requester, a status of one or more pending or open actions, including of a faciliatory action that is to be performed by the requester. Still further, a portion of the arrival plan 322 can display information about the faciliatory action that the customer is to perform.

With further reference to an example of FIG. 3B, the arrival plan 322 can also display an image-based communication or notification 330. In examples, the image-based communication or notification 330 can originate from the requester (e.g., requester operates the requester device 102 using the service application, in order to capture and edit an image). In such examples, the requester can transmit the image-based communication or notification 330 to the deliverer via the system 100. In other examples, the image-based communication or notification 330 can be stored with a corresponding one of the delivery or supplier site profile data stores 155A, 155B. Still further, the image-based communication or notification 330 can convey information as to how the deliverer can handle or traverse through a feature of the particular target site. The image-based communication or notification 330 can be previously captured for the target site by deliverers or requesters.

In examples shown by FIG. 3A and FIG. 3B, the respective arrival plans 312, 322 can be centric to a particular objective (e.g., reducing time expended for deliverer to complete delivery task), and more generally, centric to reducing effort on the part of the deliverer. As such, the arrival plans 312, 322 can display information to, for example, aid the deliverer in expediting the delivery, or otherwise reducing effort expended from the delivery.

Figures 3C, 3D:
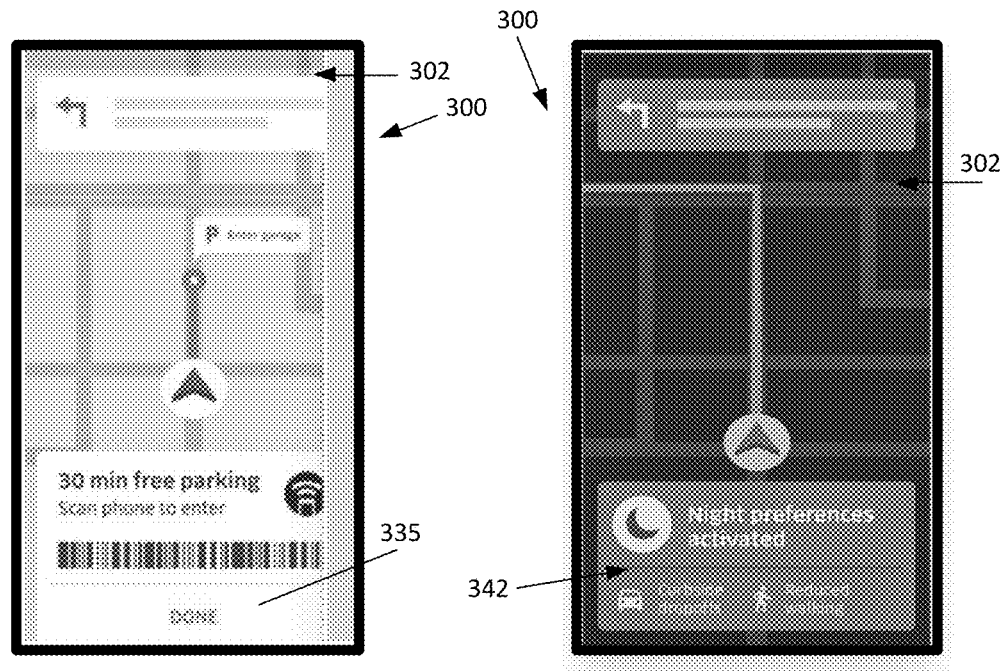

FIG. 3C illustrates another example interface to enable a deliverer to avoid incurring direct costs in connection with the deliverer performing a delivery task. As illustrated, system 100 can use known information about a target site to predict, or at least anticipate that a deliverer will likely incur a parking charge, in connection with the deliverer parking his or her vehicle to pick up delivery request items, or drop-off the items of a delivery order. In examples, the ECD component 150 can, for example, communicate the E/C-B parameter(s) 165 to the planning component 160, which in turn associates a payment token 335 to a trigger associated with the delivery service request 101. In examples, if a condition of the payment trigger is satisfied, the planning component 160 can cause the service application 116 of the deliverer to generate the payment token 335. The payment token 335 can enable the deliverer to use, for example, a code that results in a parking charge to be incurred and paid by the system 100. As described by other examples, the requester can authorize and subsequently be charged for the use of the payment token 335.

FIG. 3D illustrates another example interface for displaying a variation of an arrival plan to a deliverer. In an example of FIG. 3D, an alternative arrival plan 342 is generated for the deliverer to meet a deliverer preference of prioritizing safety. As such, the alternative arrival plan 342 can be generated to be centric to the preferred objective of safety for the deliverer. In such examples, an alternative set of rules may be used to select features and actions the requester can perform to prioritize the objective of safety. In such examples, the objective of safety can, for example, set criterion for selecting a parking lot for the requester based on factors such as proximity of the parking lot to the delivery location 108, and feedback by prior deliverers as to particular characteristics of the parking lot (e.g., overall assessment of safety, lighting, etc.). In examples, the alternative arrival plan 342 can be generated conditionally, such as based on conditions determined by contextual information (e.g., time of day, day of week, lighting, weather, etc.).

FIG. 3E illustrates another example interface for displaying a navigation plan to a deliverer in connection with the deliverer being matched to a delivery service request. In contrast to an arrival plan, a navigation plan 344 can encompass a sequence of instructions that the deliverer can follow when traveling from a starting location to a supplier location 131, and/or from the supplier location 131 to a delivery location 108. The navigation plan 344 can include turn by turn navigation instructions, along with information that identifies features that may cause the deliverer to expend effort. In examples, the amount of effort can be quantized as a score, with the location of features specifically identified on one or more routes. In some examples, the navigation plan 344 can include one or more indicators 345 of exertion (e.g., physical effort that causes strain) and/or difficulty with respect to skill level. The indicators 345 can be displayed for deliverers who utilize physical transport (e.g., bicycle (including motorized variants thereof), walking, scooter, etc.), at least for a portion of the overall route. With reference to an example of FIG. 3E, a segment of a route can be colored, highlighted or otherwise marked apart from a remainder of the route, to illustrate the portion of the route which will likely cause a noteworthy or significant amount of exertion (e.g., exceeds a standard of deviation above the average).

To facilitate the deliverers in planning the deliveries, the navigation plan 344 can provide information about alternative routes, with indicators of a cost/benefit to the alternatives (e.g., less difficult, but longer amount of time). Still further, the navigation plan 344 can also identify alternative modes of transport for one or multiple routes, with indicators on exertion level, difficulty level, or duration of travel as between the alternative modes of travel.

FIG. 3F and FIG. 3G illustrate a variation in which an example interface automatically changes state to display various types of information relating to the deliverer's account and activities. In some examples, the interface 302 can be configured to automatically display select content items to the deliverer based on an activity state of the deliverer. For example, at the delivery site, the interface 302 can display one of the arrival plans 312 (FIG. 3A), 322 (FIG. 3B).

The system 100 can further detect when the deliverer is, for example, waiting at the supplier location for delivery items that are being prepared (FIG. 3F). In the wait state, an example provides that the interface 302 displays a prompt 347 (FIG. 3F) to solicit an effort on the part of the deliverer to provide profile information about the supplier site. In FIG. 3G, a questionnaire panel 349 can be displayed to solicit the feedback of the deliverer, where the feedback can be solicited for purpose of developing the supplier or developer site profiles. The questionnaire panel 349 can, for example, be in the form of a set of questions (e.g., multiple choice), to which the developer can make selection from. In other examples, other types of input can be solicited from the supplier. For example, in variations, the interface 302 can prompt the deliverer to upload a picture of a particular feature of a target site (e.g., such as entrance to building for delivery location 108 or supplier location 131). The system 100 can store information provided by the deliverer for the supplier site with, for example, the supplier site profile data store 155B. In variations, similar prompts, questionnaires, or input mechanisms can be used to cause the deliverer to provide input at the delivery site.

The deliverer's input (e.g., response to questions) can be used to identify features of the supplier or delivery site which can cause added effort or cost. Additionally, the deliverer's input can also be used to identify actions the deliverer can perform to reduce or minimize the expended effort or cost. Still further, the deliverer's input can be used to identify faciliatory actions 153 which the requester can perform to reduce the expended effort, as well as to determine the effectiveness of such faciliatory actions 153.

With further reference to FIG. 3F and FIG. 3H, the effort that the deliverer is determined to make in various stages of performance during a particular delivery, or over a given time period that encompasses multiple deliveries, can be scored and/or valued. In an example of FIG. 3F, the interface 302 includes an award value 351 representing non-monetary benefits when aggregated. As described with other examples, the award value 351 can include points that are directly related to effort on the part of the deliverer. Depending on implementation, the points can include a value that correlates to, or is determined from the E/C-B parameter(s) 165. In variations, the points can include a value that correlates to effort on the part of the deliverer in performing more mundane tasks, other than travel, such as interfacing with the deliverer's device 300 to provide profile information about a supplier or delivery site.

In some variations, the planning component 160 can convert the EC-B parameter(s) 165, whether estimated or predicted in advance or through monitoring, into units of value. The units of value can be in the form of points, for example, to convey a non-monetary or aggregate (e.g., when point threshold is received) benefit to the deliverer. In variations, the planning component 160 can convert the E/C-B parameter(s) 165 for the deliverer's tasks into monetary compensation. For example, the interface 302 can be operated to display an accounting panel 357, showing the monetary value residing with the deliverer's account. In an example shown, the overall account value for the deliverer can identify a line item 359 reflecting monetary value that credits the deliverer for expending added effort during deliveries. The account manager 170 can update the deliverer account store 173 to reflect the amount of compensation or award that is conferred onto the deliverer.

Figure 3I:
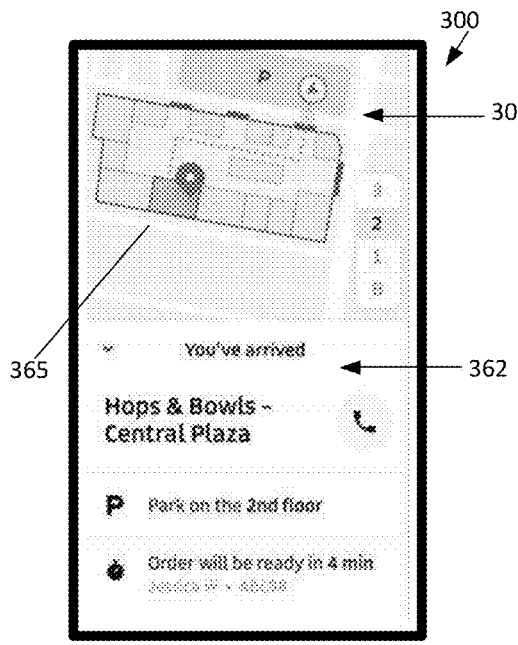

FIG. 3I illustrates another example interface for displaying an arrival plan to a deliverer in connection with the deliverer arriving at a supplier location to pick up items for a delivery order. In examples, the interface 302 can display an arrival plan 362 that is similar to arrival plans for the delivery site. For the supplier site, the arrival plan 362 can indicate available parking, based on prioritization of effort (e.g., length of walk), cost (e.g., charge for parking) or other metrics (e.g., safety). The arrival plan 362 can include map content 365, text content (not shown) that include instructions or additional guidance, and/or image content to show information that is specific to the supplier site and readily conveyed through imagery (e.g., hostess counter where the deliverer can pick up the items of a delivery). Over time, input and feedback from deliverers can become more detailed so that the arrival of the deliverer at the supplier location 131 is accomplished with the deliverer reducing the amount of effort (e.g., amount walked, waiting time, etc.) and the instructions and guidance for the deliverer being specific enough to minimize the deliverer's presence at the supplier location 131.

Figure 3J:
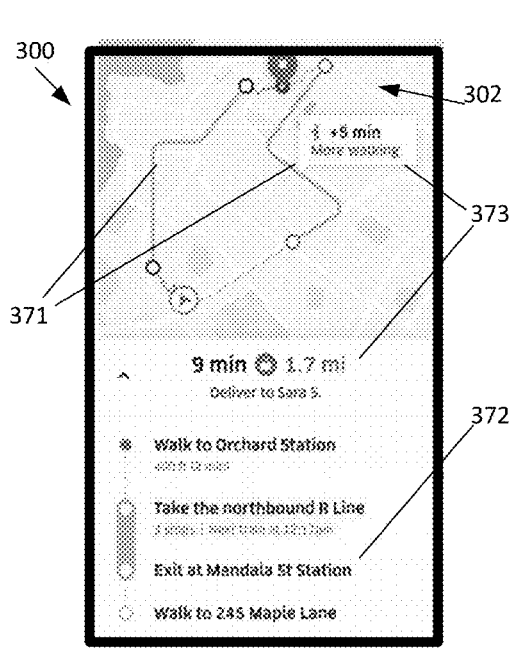
Figure 3K:
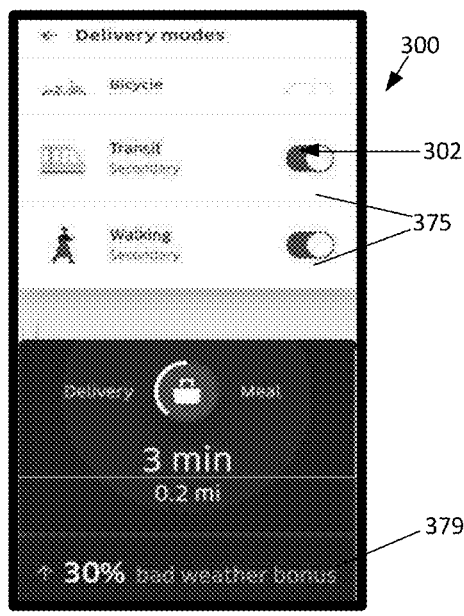

FIG. 3J and FIG. 3K illustrate alternative example interfaces to enable a deliverer to select multiple modes of transport for completing different portions of a delivery. In an example of FIG. 3J, a multi-leg navigation plan 372 can depict alternative routes 371, utilizing different forms of manual transport (e.g., biking or walking). The multi-leg navigation plan 372 (FIG. 3K) can be generated to accommodate different modes of transport from the deliverer (e.g., public transport and (walking or bike)). The navigation plan 372 can further display one or more indicators 373 of effort, or comparative effort, as between alternative routes and modes of transport. The indicators 373 can reflect, for example, a difference in the amount of walking, biking, exertion (e.g., calories burned), duration or length of physical exertion as between alternative routes or route segments utilizing different modes of transport. For each route or route segment, the navigation plan 372 can generate step-by-step navigation instructions, as well as other instructions that are likely to reduce the amount of effort expended by the deliverer.

In an example of FIG. 3K, the interface 302 can include one or multiple mode selection features 375 that enables the deliverer to select a transport mode amongst multiple available transport modes, for individual segments of a navigation plan. The distance or time of travel (or alternative the remaining distance or time of travel) can be displayed for individual modes, in connection with a particular route. The information can also be dynamic and/or responsive to the selection(s) of the deliverer, as well as to a location of the requester. In some examples, the interface 302 can also display an indicator 379 of value (either compensatory or non-compensatory) based on a determination of effort that the deliverer may expend in performing the delivery. For example, in an example of FIG. 3K, the indicator 379 awards a compensatory bonus to the deliverer to reward the deliverer for delivering a service request in bad weather.

Figure 3L:
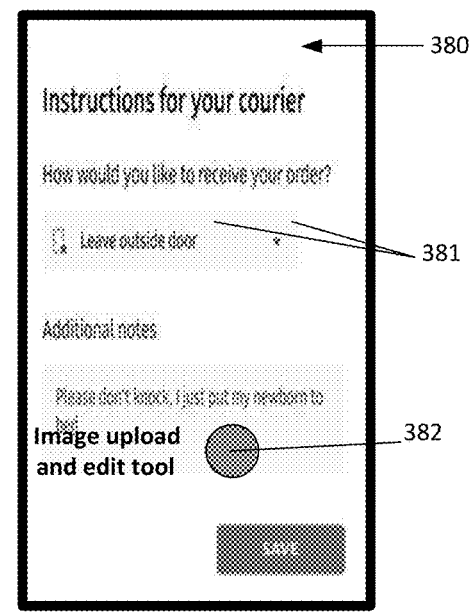

FIG. 3L illustrates a requester interface for specifying one or more actions for a deliverer to perform in connection with a delivery order. In more detail, a requester interface 380 can be generated on a requester device 301, through use of a respective service application. By way of example, the planning component 160 can communicate content and/or information for inclusion of the requester interface 380, via the requester device interface 110.

In some examples, the requester interface 380 enables the requester to communicate directly with the deliverer, using messaging and/or voice communications. For example, input provided to the requester interface 380 can be received by the requester device interface 110, and forwarded to the deliverer device 300 via the deliverer device interface 124. Through use of the requester interface 380, the requester can, for example, compose or otherwise specify a message to the deliverer, where the message identifies a faciliatory action 153 that the requester can or will perform when the deliverer arrives to the delivery site. For example, the requester can specify an alternative meeting location where the deliverer can drop-off or meet the requester to hand off the delivery order. As described with other examples, the requester interface 380 can specify a value for the faciliatory action(s) of the requester, such as a reduction in the service charge of a delivery order.

In some examples, an acceptable faciliatory action 153 can correspond to the requester using the requester interface 380 to identify a drop-off location outside of the delivery location 108 (e.g., by front door, or in hallway of building). In an example of FIG. 3L, a pull-down menu 381 or other user-interface feature (e.g., text block) can be provided to enable the requester to specify a particular faciliatory action 153, such as the action of allowing the deliverer to drop-off a delivery order without knocking or waiting for the requester (e.g., thus reducing or eliminating waiting time on the part of the deliverer).

In variations, an acceptable faciliatory action 153 can correspond to the requester using an image upload and edit tool 382 to upload an image, where the image is identified or used to facilitate the deliverer (e.g., the image depicts an alternative drop-off location, or meeting location to meet the deliverer). For example, the requester can use the tool 382 to take an image of a specific region near the requester's front door, where the deliverer is to drop-off a delivery order.

Computer System

Figure 4:
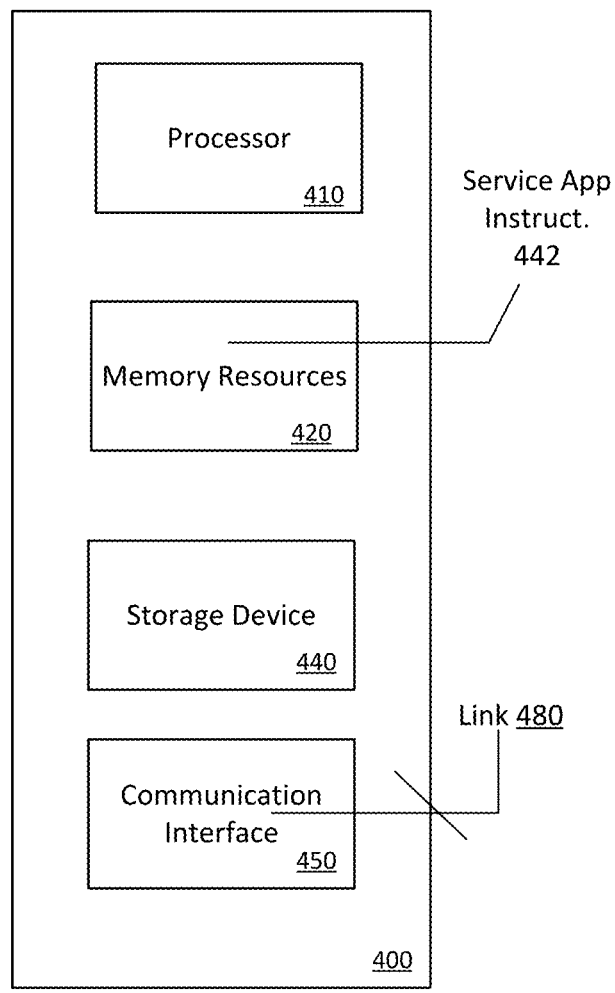
FIG. 4 illustrates a computer system on which one or more embodiments can be implemented.

FIG. 4 illustrates a computer system on which one or more embodiments can be implemented. A computer system 400 can be implemented on, for example, a server or combination of servers. For example, the computer system 400 may be implemented as part of a network computing system, such as shown by an example of FIG. 1. Likewise, the computer system 400 can implement methods such as described with examples of FIG. 2A through FIG. 2C.

In one implementation, the computer system 400 includes processing resources 410, memory resources 420 (e.g., read-only memory (ROM) or random-access memory (RAM)), a storage device 440, and a communication interface 450. The computer system 400 includes at least one processor 410 for processing information stored in the main memory 420, such as provided by a random-access memory (RAM) or other dynamic storage device, for storing information and instructions which are executable by the processor 410. The main memory 420 also may be used for storing temporary variables or other intermediate information during execution of instructions to be executed by the processor 410. The computer system 400 may also include the memory resources 420 or other static storage device for storing static information and instructions for the processor 410. The storage device 440, such as a magnetic disk or optical disk, is provided for storing information and instructions.

The communication interface 450 enables the computer system 400 to communicate with one or more networks (e.g., cellular network) through use of the network link 480 (wireless or a wire). Using the network link 480, the computer system 400 can communicate with one or more computing devices, specialized devices and modules, and/or one or more servers. The executable instructions stored in the memory 420 can include instructions 442, to implement a network computing system such as described with an example of FIG. 1. The executable instructions stored in the memory 420 may also implement methods, such as described with examples of FIG. 2A through FIG. 2C.

As such, examples described herein are related to the use of the computer system 400 for implementing the techniques described herein. According to an aspect, techniques are performed by the computer system 400 in response to the processor 410 executing one or more sequences of one or more instructions contained in the memory 420. Such instructions may be read into the memory 420 from another machine-readable medium, such as the storage device 440. Execution of the sequences of instructions contained in the memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

User Device

Figure 5:
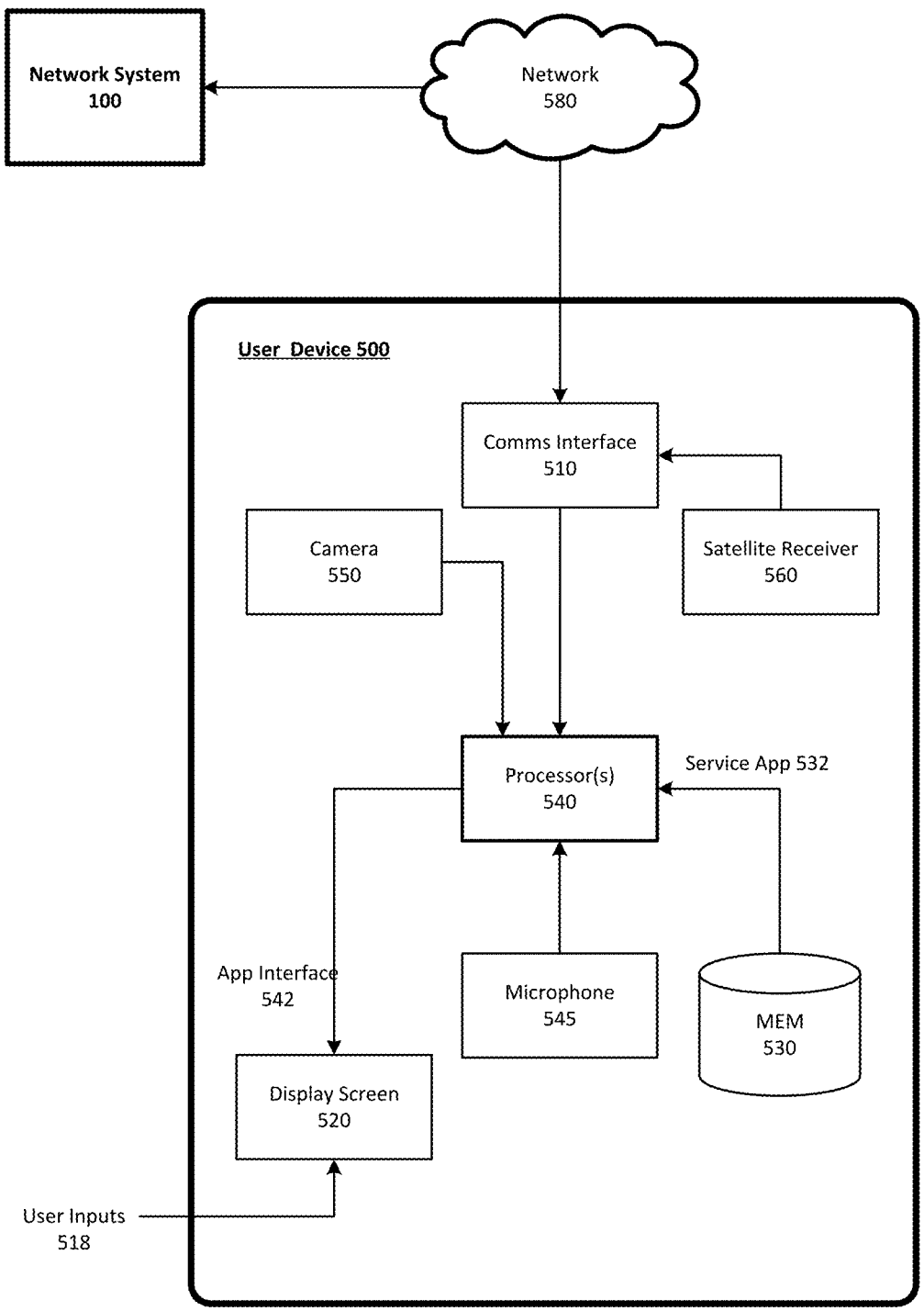
FIG. 5 is a block diagram illustrating an example requester device for use with examples as described.

FIG. 5 is a block diagram illustrating an example user device for use with examples as described. In an example, a user device 500 may execute a designated service application for a network service implemented through a network computing system 100, such as described with an example of FIG. 1. In many implementations, a user device 500 can include a mobile computing device, such as a smartphone, tablet computer, laptop computer, VR or AR headset device, and the like. As such, the user device 500 can include typical telephony and/or tablet features such as a microphone 545, a camera 550, a satellite receiver 560, and a communication interface 510 to communicate with external entities using any number of wireless communication protocols. In certain aspects, the user device 500 can store a designated application (e.g., a service app 532) in a local memory 530. In variations, the memory 530 can store additional applications executable by one or more processors 540 of the user device 500, enabling access and interaction with one or more host servers over one or more networks 580.

In response to a user input 518 (e.g., search input), the service application 532 can interact with the user device 500 to display an application interface 542 on a display screen 520 of the user device 500. When the user device 500 is used as a requester device, the application interface 542 can be used to display, for example, interfaces such as shown and described with examples of FIG. 3A through FIG. 3L.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
one or more processors;
a memory to store a set of instructions;
a predictive model trained using machine learning based on historical data comprising an amount of effort that deliverers have previously expended to reach historical delivery locations;
wherein the one or more processors access the instructions to:
receive, over one or more networks, an order request from a requester device, the order request specifying a food preparation source, a delivery address, and one or more food items that are to be prepared at the food preparation source;
determine, using the predictive model of the network computer system, metrics that represent a level of effort with respect to delivering a delivery order based on the order request to the delivery address, the metrics (i) being independent of a distance and time of travel from a location of the food preparation source to a site of the delivery address, (ii) being based, at least in part, on an amount of exertion that a deliverer is expected to expend to reach a drop-off location after arriving at the site of the delivery address, and (iii) being based, at least in part, on the historical data comprising the amount of effort previously expended to reach historical delivery locations;
determine a service charge value based at least in part on the metrics; and
communicate, over one or more networks, the service charge value to the requester device.

2. The network computer system of claim 1, wherein the one or more metrics are based at least in part on a topographical aspect of the site of the delivery address.

3. The network computer system of claim 1, wherein the one or more metrics are based on an amount of exertion that the deliverer actually expends, or is expected to expend, to reach a drop-off location after arriving at the site of the delivery address.

4. The network computer system of claim 1, wherein the one or more metrics are based on an amount of time that the deliverer is expected to take to reach a drop-off location once the deliverer arrives at the site of the delivery address.

5. The network computer system of claim 1, wherein the one or more metrics are based at least in part on a presence of one or more barriers that are present, or expected to be present at the site of the delivery address and which delay or hinder an ability of the deliverer to reach a drop-off location for the delivery order.

6. The network computer system of claim 1, wherein the one or more metrics are based at least in part on profile information that is stored in connection with the site of the delivery address.

7. The network computer system of claim 1, wherein the one or more metrics are indicative of a change in elevation at the site of the delivery address.

8. The network computer system of claim 1, wherein the one or more processors access the instructions to monitor sensor information obtained from a mobile computing device of the deliverer as the deliverer traverses through the site of the delivery address to a drop-off location for the delivery order.

9. The network computer system of claim 8, wherein the one or more processors determine the metrics based at least in part on the monitored sensor information obtained from the mobile computing device of the deliverer.

10. The network computer system of claim 8, wherein the one or more processors receive feedback from the deliverer, and determine the metrics based at least in part on the feedback.

11. The network computer system of claim 8, wherein the one or more metrics include a metric that is indicative of a change in elevation.

12. The network computer system of claim 8, wherein the one or more metrics include a metric that is indicative of a heart rate of the deliverer.

13. The network computer system of claim 8, wherein the one or more metrics include a metric that is indicative of a change in elevation, the metric being based at least in part on accelerometer information communicated from the mobile computing device of the deliverer from the time the deliverer initiates traversal at the site of the delivery address.

14. The network computer system of claim 1, wherein the one or more processors determine the metrics by tracking a deliverer at the site of the delivery address, and comparing the metrics to previously recorded metrics for the prior deliveries to the site of the delivery address.

15. The network computer system of claim 1, wherein the one or more processors communicate the service charge value to the requester device before completing delivery of the delivery order.

16. The network computer system of claim 15, wherein the one or more processors access the instructions to:
provide the requester device with an interface to enable a requester to specify an instruction for the deliverer that is expected to reduce an amount of time that the deliverer incurs.

17. The network computer system of claim 16, wherein the one or more processors access the instructions to:
determine an updated service charge value based on the instruction specified by the requester.

18. The network computer system of claim 17, wherein the interface enables the requester to operate the requester device to capture, edit and transmit an image for the deliverer.

19. The network computer system of claim 16, wherein the interface enables the requester to compose a message that is communicated directly to the deliverer.

20. The network computer system of claim 1, wherein the site of the delivery address is based on a predetermined region that surrounds an entrance to a dwelling of the delivery address.

21. The network computer system of claim 20, wherein the predetermined region corresponds to a building and a surrounding perimeter.

22. The network computer system of claim 1, wherein the site of the delivery address is based on a predicted location or region where the deliverer is expected to exit a delivery vehicle to walk to a drop-off location for the delivery order.

23. The network computer system of claim 1, wherein the one or more processors access the instructions to determine a path of traversal through the site of the delivery address to a drop-off location for the delivery order based on a profile of the site, and wherein the one or more processors determine one or more metrics based on one or more characteristics of the path of traversal.

24. The network computer system of claim 1, wherein the one or more processors access the instructions to:
monitor sensor information obtained from a mobile computing device of the deliverer as the deliverer traverses through the site of the delivery address to the drop-off location; and
update the information that is stored about the site using the monitored sensor information.

25. The network computer system of claim 1, wherein the metrics include a metric that is indicative of an amount of time that the is expected to incur while parking.

26. The network computer system of claim 1, wherein the one or more metrics include a contextual parameter that reflects a contextual event that affects an amount of effort expended by the deliverer.

27. The network computer system of claim 1, wherein the one or more metrics include a delivery vehicle type parameter that indicates a vehicle type used by the deliverer.

28. The network computer system of claim 1, wherein the one or more metrics reflect each of a characteristic of the delivery order and a contextual event.

29. The network computer system of claim 1, wherein the metrics are determined based at least in part on monitored sensor information obtained from a mobile computing device of the deliverer.

30. The network computer system of claim 1, wherein the service charge value is communicated to the requester device before completing delivery of the delivery order.

31. A method comprising:
training a predictive model using machine learning based on historical data comprising an amount of effort that deliverers have previously expended to reach historical delivery locations;
receiving, over one or more networks, an order request from a requester device, the order request specifying a food preparation source, a delivery address, and one or more food items that are to be prepared at the food preparation source;
determining, using the predictive model, metrics that represent a level of effort with respect to delivering a delivery order based on the order request to the delivery address, the metrics (i) being independent of a distance and time of travel from a location of the food preparation source to a site of the delivery address, (ii) being based, at least in part, on an amount of exertion that a deliverer is expected to expend to reach a drop-off location after arriving at the site of the delivery address, and (iii) being based, at least in part, on the historical data comprising the amount of effort previously expended to reach historical delivery locations;
determining a service charge value based at least in part on the metrics; and
communicating, over one or more networks, the service charge value to the requester device.

32. A device comprising:
one or more processors;
a predictive model trained using machine learning based on historical data comprising an amount of effort that deliverers have previously expended to reach historical delivery locations
memory storing instructions that when executed by the one or more processors perform a method comprising:
receiving, over one or more networks, an order request from a requester device, the order request specifying a food preparation source, a delivery address, and one or more food items that are to be prepared at the food preparation source;
determining, using the predictive model of the device, metrics that represent a level of effort with respect to delivering a delivery order based on the order request to the delivery address, the metrics (i) being independent of a distance and time of travel from a location of the food preparation source to a site of the delivery address, (ii) being based, at least in part, on an amount of exertion that a deliverer is expected to expend to reach a drop-off location after arriving at the site of the delivery address, and (iii) being based, at least in part, on the historical data comprising the amount of effort previously expended to reach historical delivery locations;
determining a service charge value based at least in part on the metrics; and
communicating, over one or more networks, the service charge value to the requester device.

* * * * *